United States Patent
Cho et al.

(10) Patent No.: US 12,457,280 B2
(45) Date of Patent: Oct. 28, 2025

(54) ELECTRONIC DEVICE INCLUDING HINGE STRUCTURE

(71) Applicant: Samsung Electronics Co., Ltd., Suwon-si (KR)

(72) Inventors: Woojin Cho, Suwon-si (KR); Choonghyo Park, Suwon-si (KR); Myoungsung Sim, Suwon-si (KR); Ki-Won Kim, Suwon-si (KR); Kiwon Kim, Suwon-si (KR); Joonrae Cho, Suwon-si (KR); Hochul Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 737 days.

(21) Appl. No.: 17/830,808

(22) Filed: Jun. 2, 2022

(65) Prior Publication Data
US 2022/0337685 A1    Oct. 20, 2022

Related U.S. Application Data

(63) Continuation of application No. PCT/KR2022/004861, filed on Apr. 5, 2022.

(30) Foreign Application Priority Data

Apr. 16, 2021    (KR) .................. 10-2021-0049709

(51) Int. Cl.
*H04M 1/02*    (2006.01)
*H04R 1/04*    (2006.01)
(Continued)

(52) U.S. Cl.
CPC ............ *H04M 1/0218* (2013.01); *H04R 1/04* (2013.01); *H04R 1/2876* (2013.01); *H04R 1/406* (2013.01); *H04R 3/005* (2013.01); *H04R 2499/11* (2013.01)

(58) Field of Classification Search
CPC .... H04M 1/0218; H04M 1/02; H04M 1/0216; H04M 1/0274; H04M 1/0277;
(Continued)

(56) References Cited

U.S. PATENT DOCUMENTS

| 5,042,071 A | 8/1991 | Stinauer et al. |
| 6,421,531 B1 * | 7/2002 | Dehan ................... H01R 35/04 |
| | | 455/575.1 |

(Continued)

FOREIGN PATENT DOCUMENTS

| JP | H10-240692 A | 9/1998 |
| JP | 2008-182296 A | 8/2008 |

(Continued)

OTHER PUBLICATIONS

International Search Report dated Jul. 15, 2022, issued in International Patent Application No. PCT/KR2022/004861.

(Continued)

*Primary Examiner* — Fred A Casca
(74) *Attorney, Agent, or Firm* — Jefferson IP Law, LLP

(57) ABSTRACT

An electronic device is provided. The electronic device includes a housing including a first housing and a second housing, a hinge configured to rotatably connect the first housing and the second housing, a flexible printed circuit board including a connection part disposed at the hinge, and configured to connect an electronic component disposed at the first housing and an electronic component disposed at the second housing, and a microphone module disposed at the connection part of the flexible printed circuit board.

20 Claims, 17 Drawing Sheets

(51) Int. Cl.
*H04R 1/28* (2006.01)
*H04R 1/40* (2006.01)
*H04R 3/00* (2006.01)

(58) Field of Classification Search
CPC ...... H04M 1/03; H04M 1/0249; H04M 1/035;
H04R 1/04; H04R 1/2876; H04R 1/406;
H04R 3/005; H04R 2499/11; H04R 3/02;
H04R 2410/05; G06F 1/16; G06F 1/1683;
G06F 1/1684; G06F 1/1688; G06F
1/1681; H05K 1/028; H05K 2201/09063;
H05K 2201/09072
See application file for complete search history.

(56) References Cited

U.S. PATENT DOCUMENTS

| | | | |
|---|---|---|---|
| 6,567,677 B1 | 5/2003 | Sokoloff | |
| 7,227,565 B2 | 6/2007 | Kawahara | |
| 7,664,284 B2 | 2/2010 | Zhang et al. | |
| 8,301,212 B2 | 10/2012 | Matsuda | |
| 8,971,552 B2 | 3/2015 | Momose et al. | |
| 9,326,057 B2 | 4/2016 | Lee | |
| 10,736,211 B2 | 8/2020 | Park et al. | |
| 2004/0137958 A1* | 7/2004 | Sawai | H04M 1/0218 455/566 |
| 2015/0010192 A1* | 1/2015 | Lee | H04R 1/02 381/365 |
| 2016/0077548 A1 | 3/2016 | Lim et al. | |
| 2016/0147263 A1 | 5/2016 | Choi et al. | |
| 2018/0324964 A1* | 11/2018 | Yoo | G06F 1/1652 |
| 2019/0166430 A1 | 5/2019 | Palmer et al. | |

FOREIGN PATENT DOCUMENTS

| | | |
|---|---|---|
| KR | 10-2015-0005119 A | 1/2015 |
| KR | 10-2016-0061064 A | 5/2016 |
| KR | 10-2020-0021172 A | 2/2020 |

OTHER PUBLICATIONS

Extended European Search Report dated Aug. 26, 2024, issued in European Application No. 22788321.2-1218.
Korean Office Action dated May 6, 2025, issued in Korean Application No. 10-2021-0049709.

* cited by examiner

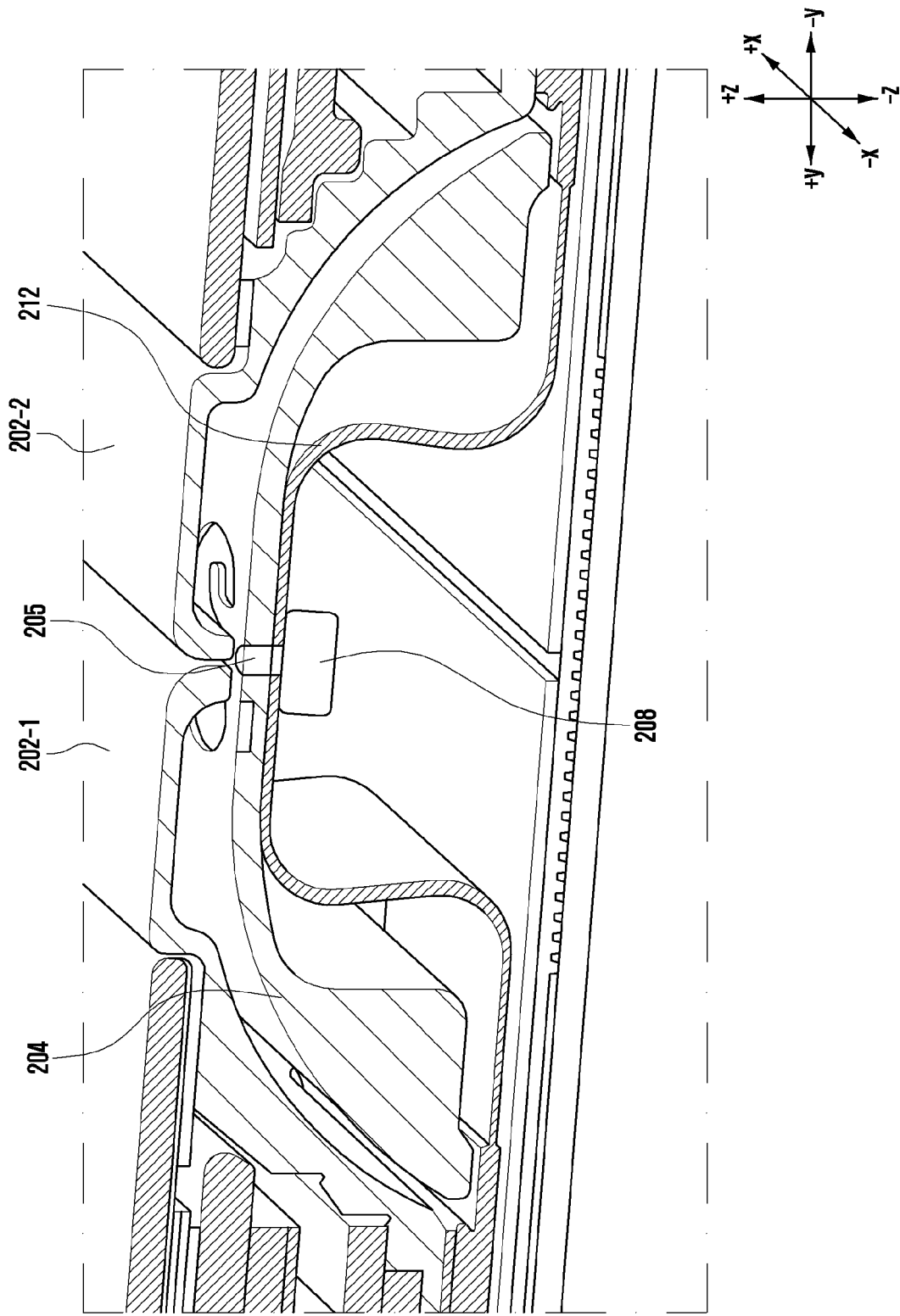

ELECTRONIC DEVICE INCLUDING HINGE STRUCTURE

CROSS-REFERENCE TO RELATED APPLICATION(S)

This application is a continuation application, claiming priority under § 365(c), of an International application No. PCT/KR2022/004861, filed on Apr. 5, 2022, which is based on and claims the benefit of a Korean patent application number 10-2021-0049709, filed on Apr. 16, 2021, in the Korean Intellectual Property Office, the disclosure of which is incorporated by reference herein in its entirety.

TECHNICAL FIELD

The disclosure relates to an electronic device including a hinge structure.

BACKGROUND ART

There has been ongoing development of technologies regarding electronic devices (for example, mobile communication terminals), and the display size of electronic devices has been increasing such that users may use various functions (for example, multimedia function, web surfing) through larger screens. As a result, the size of electronic devices has also increased continuously, and various types of electronic devices may be provided to improve portability of electronic devices. For example, a foldable electronic device may be provided, the upper and lower portions thereof being folded to face each other with reference to an axis of rotation inside the electronic device.

Such a foldable electronic device may be designed such that, in order to provide user convenience, some functions of the electronic devices may still be used in a folding state of the electronic device. For example, functions such as image capture through cameras, audio function activation, and telephone communication in the folding state of the electronic device.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

According to an embodiment, acoustic holes may be formed through upper and lower ends of an electronic device such that external sounds are introduced. A speaker hole may also be formed through the upper or lower ends of the electronic device such that sounds generated by the electronic device are emitted, and may be positioned adjacent to the acoustic holes.

One acoustic hole and the speaker hole may be adjacent in an unfolding state of the electronic device, but multiple acoustic holes and the speaker hole may be adjacent in a folding state of the electronic device. Accordingly, sounds emitted from the speaker hole may be transferred to multiple acoustic holes in the folding state of the electronic device.

Therefore, the quality of speakerphone communication in the folding state of the electronic device may be poorer than in the unfolding state of the electronic device.

Aspects of the disclosure are to address at least the above-mentioned problems and/or disadvantages and to provide at least the advantages described below. Accordingly, an aspect of the disclosure is to provide a structure for improving the quality of communication in the folding state of an electronic device.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a housing including a first housing and a second housing, a hinge configured to rotatably connect the first housing and the second housing, a flexible printed circuit board which includes a connection part disposed at the hinge unit and is configured to connect an electronic component disposed at the first housing and an electronic component disposed at the second housing, and a microphone module disposed at the connection part of the flexible printed circuit board.

Advantageous Effects of Invention

According to various embodiments disclosed herein, a microphone module and an acoustic hole may be additionally disposed in a position in which an appropriate distance from a speaker hole may be secured in the folding state of an electronic device. This may improve the quality of communication during communication.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 3C is a perspective view of a hinge unit in a state (unfolding state) in which an electronic device is unfolded according to an embodiment of the disclosure;

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
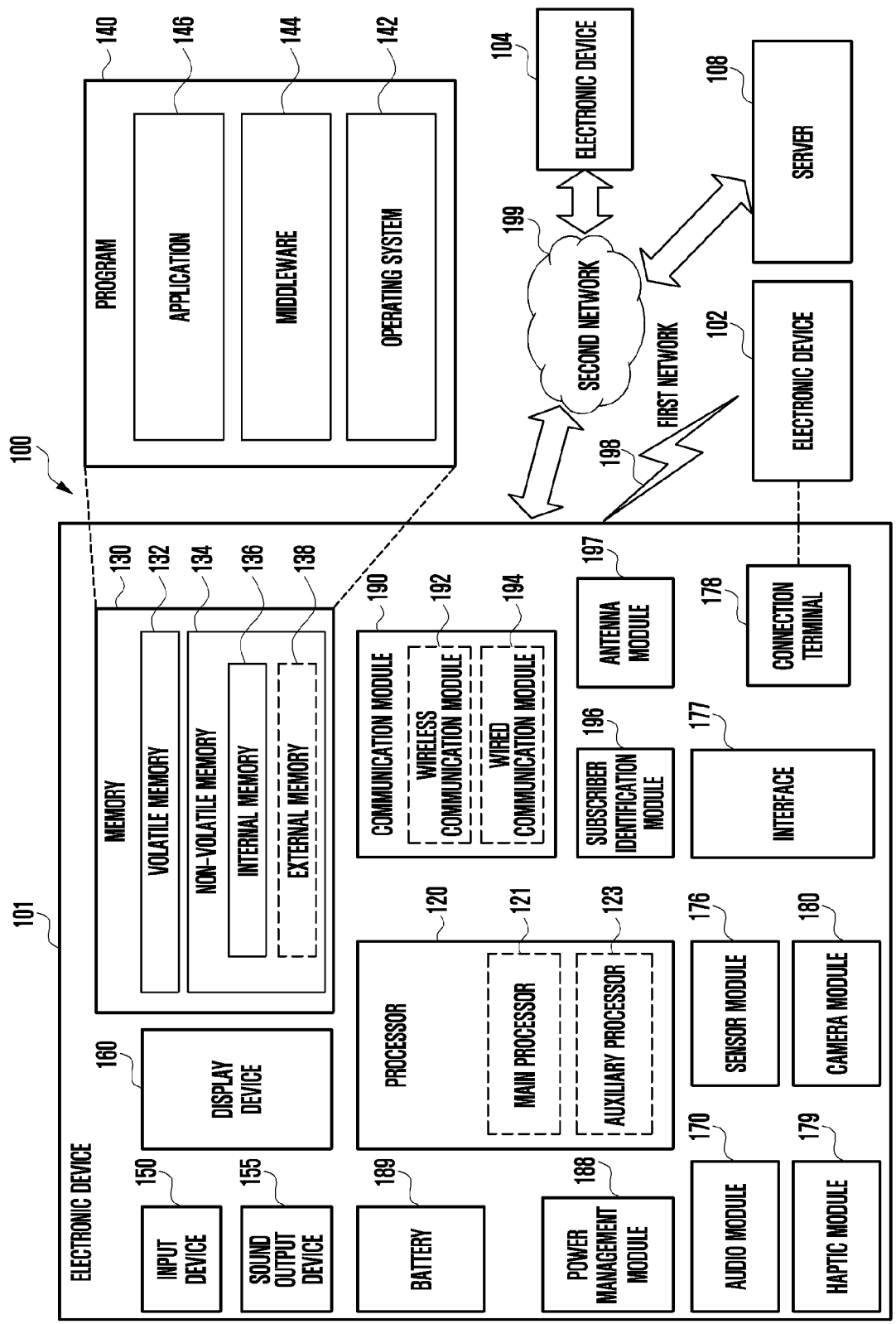
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

In the following description, the same reference numerals will be used for all the same or similar components unless otherwise indicated. In addition, the description for the same reference numerals may be omitted.

Figure 2A:
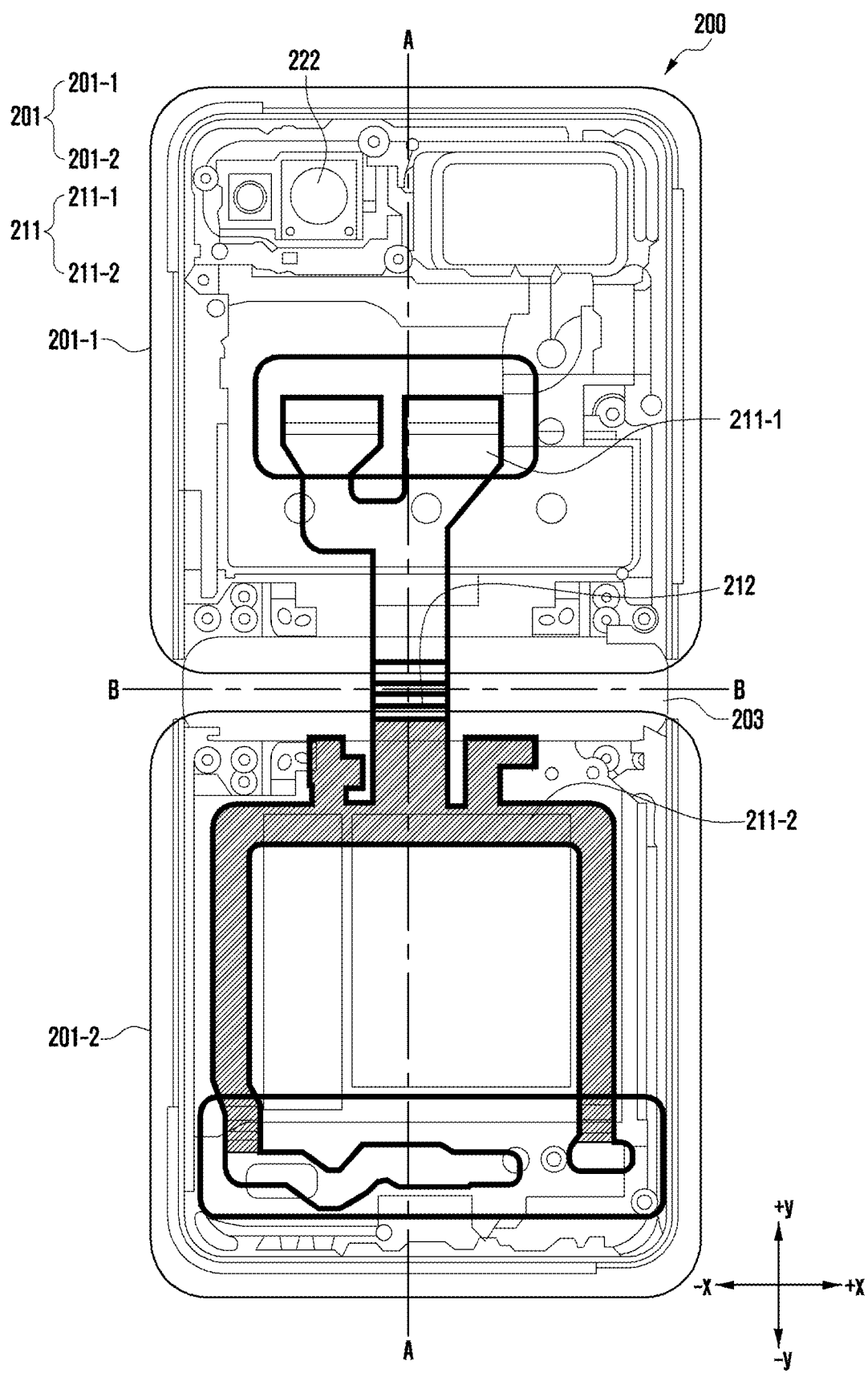
FIG. 2A is a diagram of elements of an electronic device according to an embodiment of the disclosure.

FIG. 2A is a diagram of elements of an electronic device according to an embodiment of the disclosure.

Figure 2B:
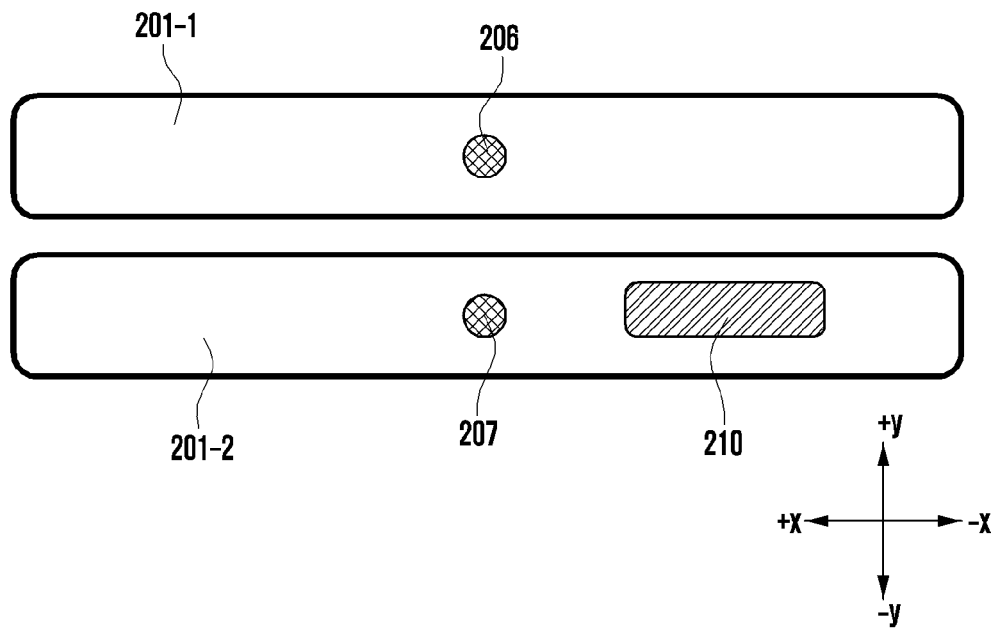
FIG. 2B is a plan view illustrating a speaker hole and first and second acoustic holes in a state (folding state) in which an electronic device is folded according to an embodiment of the disclosure.

FIG. 2B is a plan view illustrating a speaker hole and first and second acoustic holes in a state (folding state) in which an electronic device is folded according to an embodiment of the disclosure.

Referring to FIG. 2A, an electronic device 200 (e.g., an electronic device 101 in FIG. 1) may include a first housing 201-1, a second housing 201-2, and a hinge unit 203. At least one of a camera module 222 (e.g., a camera module 180 in FIG. 1), a first battery (not illustrated) (e.g., a battery 189 in FIG. 1), a first sound output device (e.g., a first speaker module) (not illustrated) (e.g., a sound output module 155 in FIG. 1), and a first microphone module (not illustrated) (e.g., an audio module 170 in FIG. 1) configured to receive external sound may be disposed at the first housing 201-1. The first sound output device disposed at the first housing 201-1 may be a call receiver. A receiver may be used for receiving incoming calls. At least one of a second battery (e.g., the battery 189 in FIG. 1), a second sound output device (e.g., a speaker module) (not illustrated) (e.g., the sound output module 155 in FIG. 1), and a second microphone module (not illustrated) (e.g., the audio module 170 in FIG. 1) configured to receive external sound may be disposed at the second housing 201-2. The second sound output device may be connected to a plurality of speaker holes 210 configured to emit sound generated from the electronic device 200. In addition, various electronic components may be disposed at, at least one of the first housing 201-1 and the second housing 201-2. At least a part of the elements described above may be omitted and other elements may be added.

According to various embodiments, the first housing 201-1 and the second housing 201-2 may be coupled to be rotatable with respect to each other through the hinge unit 203. The hinge unit 203 may be a concept that collectively refers to a hinge unit configured to rotatably connect the first housing 201-1 and the second housing 201-2. For example, the second housing 201-2 may rotate with respect to the first housing 201-1 to be folded.

According to various embodiments, the first housing 201-1 and the second housing 201-2 may be folded so that the overall shape of the electronic device 200 is changed. For example, the distance or the angle formed between a pair of housings 201 may vary depending on whether the electronic device 200 is in an unfolding state (flat state), a folding state, or an intermediate state in which the first housing 201-1 and the second housing 201-2 form a predetermined angle, and thus the overall shape thereof may be changed.

According to various embodiments, the folding state of the electronic device 200 may be a state in which the first housing 201-1 and the second housing 201-2 substantially face each other. When the electronic device 200 is folded, the electronic device 200 is deformed to be compact as a whole, so that the portability of the electronic device 200 may be improved. In a state in which the electronic device 200 is unfolded, the part in which a display module is exposed to the outside may be reduced. Therefore, the risk of damage to the display module due to external impact may be reduced.

According to various embodiments, the first housing 201-1 and the second housing 201-2 may be arranged at both sides around a folding axis (e.g., a B-B axis in FIG. 2A) and may have a shape substantially symmetrical with respect to the folding axis. Here, the folding axis may mean a virtual axis.

According to various embodiments, the pair of housings 201 may be formed in various ways such as molding and die-casting. The pair of housings 201 may be formed of various materials such as a metal material and/or a non-metal material. Here, the metal material may include an alloy such as aluminum, stainless steel (STS and SUS), iron, magnesium, titanium, and the like, and the non-metal material may include synthetic resin, ceramic, and engineering plastic. The various segmented parts of the pair of housings 201 may be connected in various ways such as junction via an adhesive, junction via welding, junction via bolt-coupling, and the like. The shape, material, and forming method of the housing 201 illustrated in FIG. 2A described above are merely an example, and the housing 201 may be variously changed within a range in which those skilled in the art may implement the same.

According to various embodiments, a display module (not illustrated) (e.g., a display module 160 in FIG. 1) supported by the pair of housings 201 may be disposed at a front surface of the electronic device 200. The display module may include all of the various devices which may display visual information. According to an embodiment, at least a part of the display module may be folded by the rotation of the first housing 201-1 and the second housing 201-2.

According to various embodiments, the display module may be a flexible display in which at least a partial area thereof may be folded. In an embodiment, a substrate of the display module may be formed of a flexible material. For example, the substrate of the display module may be formed of polymer material, such as polyethylene terephthalate (PET) and polyimide (PI), or ultra-thin glass (UTG).

According to various embodiments, referring to FIG. 2A, a flexible printed circuit board 211 may be disposed at the electronic device 200. An electronic component disposed at the first housing 201-1 and an electronic component of the second housing 201-2 may be connected via the flexible printed circuit board 211.

According to various embodiments, the flexible printed circuit board 211 may be disposed at the first housing 201-1, the hinge unit 203, and the second housing 201-2, respectively. For example, the flexible printed circuit board may be divided into a first part 211-1 including one end of the flexible printed circuit board 211 and disposed at the first housing 201-1, a second part 211-2 including the other end of the flexible printed circuit board 211 and disposed at the second housing 201-2, and a connection part 212 configured to electrically connect the first part 211-1 and the second part 211-2 and disposed at the hinge unit 203. The first part 211-1 of the flexible printed circuit board 211 may be connected to a first printed circuit board (not illustrated) connected to an electronic component disposed at the first housing 201-1, and the second part 211-2 of the flexible printed circuit board 211 may be connected to a second printed circuit board (not illustrated) connected to an electronic component disposed at the second housing 201-2. The electronic component disposed at the first housing 201-1 and the electronic component disposed at the second housing 201-2 may be electrically connected via the first part 211-1 and the second part 211-2 of the flexible printed circuit board 211.

According to various embodiments, the connection part 212 of the flexible printed circuit board 211 may move according to the rotation of the first housing 201-1 with respect to the second housing 201-2. The first part 211-1 including one end of the flexible printed circuit board 211 may be connected to the electronic component disposed at the first housing 201-1 to be fixed, and the second part 211-2 including the other end of the flexible printed circuit board 211 may be connected to the electronic component disposed at the second housing 201-2 to be fixed. When the second housing 201-2 rotates with respect to the first housing 201-1 in a state in which both ends are fixed to the first housing 201-1 and the second housing 201-2, a part of the flexible printed circuit board 211 may be deformed. The deformation of the flexible printed circuit board 211 may be understood as the movement with respect to the fixed elements.

The first part 211-1, the second part 211-2, and the connection part 212 described above are concepts for describing the position where each part of the flexible printed circuit board 211 is positioned on the electronic device 200, and may not be actually separated from each other on the flexible printed circuit board 211.

Referring to FIG. 2B, the electronic device 200 may include a first acoustic hole 206 and a second acoustic hole 207. The first acoustic hole 206 may be disposed at an upper end of the first housing 201-1. The first acoustic hole 206 may be connected to a first microphone module. The second acoustic hole 207 may be disposed at a lower end of the second housing 201-2. The second acoustic hole 207 may be connected to a second microphone module. According to an embodiment, referring to FIG. 2B, the first acoustic hole 206 may be disposed at the top side of the first housing 201-1 and the second acoustic hole 207 may be disposed at the bottom side of the second housing 201-2. The first acoustic hole 206 and the second acoustic hole 207 may be positioned on the same plane in a state the pair of housings 201 are folded. The first acoustic hole 206 and the second acoustic hole 207 may mean openings formed such that the external sound of the electronic device 200 is transferred to the first microphone module and the second microphone module. The first acoustic hole 206 and the second acoustic hole 207 may be formed at the appropriate position of the first housing 201-1 and the second housing 201-2 and may be formed in various shapes.

According to various embodiments, the speaker hole 210 may be disposed at, at least one of the top of the first housing 201-1 and the bottom of the second housing 201-2. The speaker hole 210 may be connected to at least one of the first sound output device and the second sound output device. The speaker hole 210 may mean an opening formed such that the sound generated by the first sound output device or the second sound output device is emitted to the outside of the electronic device 200. The speaker hole 210 may be disposed at a part adjacent to the first acoustic hole 206 and/or the second acoustic hole 207. For example, referring to FIG. 2B, the speaker hole 210 may be disposed at the bottom side of the second housing 201-2 to be adjacent to the second acoustic hole 207.

The positions of the first acoustic hole 206, the second acoustic hole 207, and the speaker hole 210 illustrated in FIG. 2B are merely embodiments and the positions are not limited to the positions illustrated in FIG. 2B. The positions of the first acoustic hole 206, the second acoustic hole 207, and the speaker hole 210 may be variously changed within a range in which those skilled in the art may implement the same.

Figure 3A:
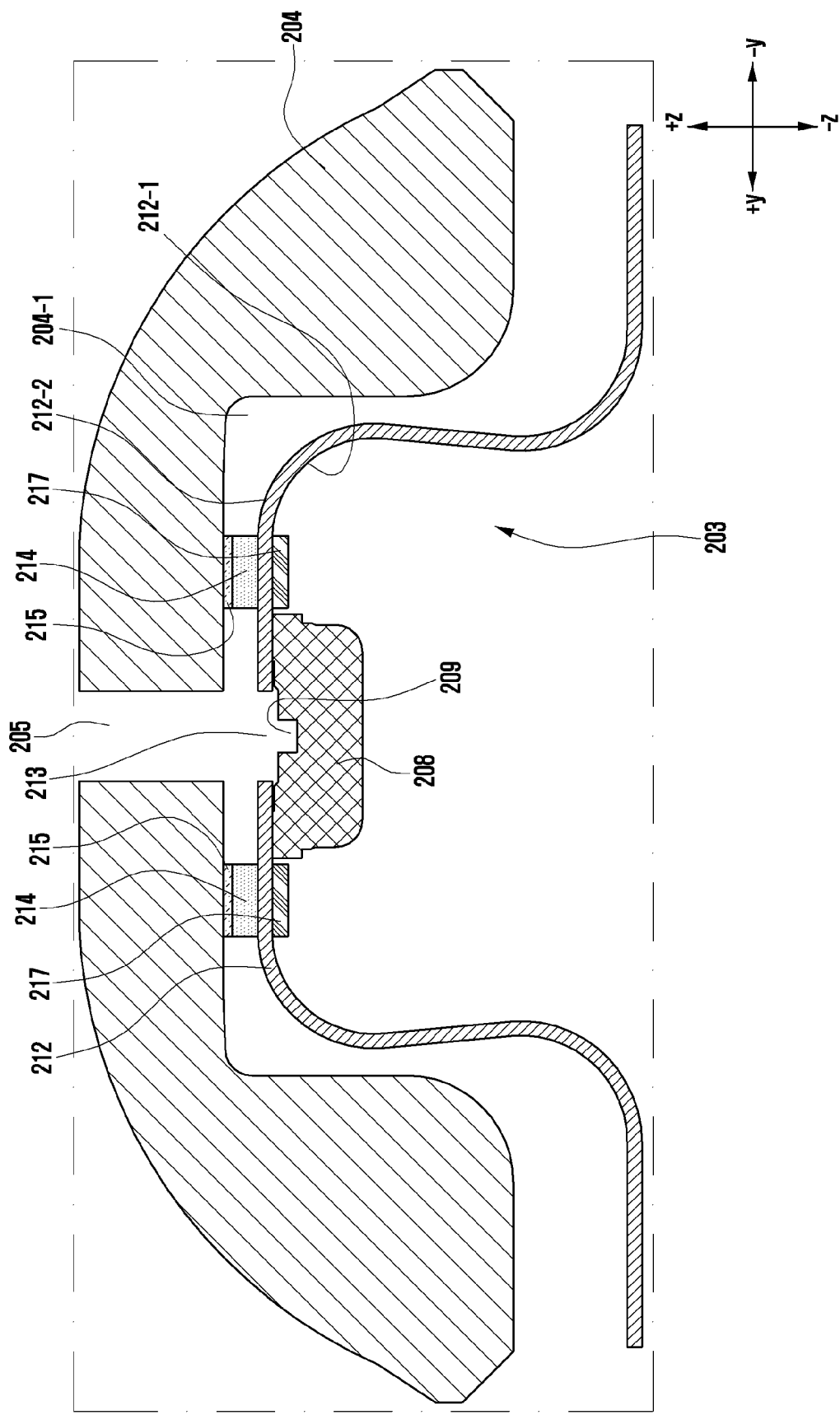
FIG. 3A is a cross-sectional view of a hinge unit of the electronic device in FIG. 2A taken along line A-A, and an enlarged view of the hinge unit in FIG. 3C according to an embodiment of the disclosure.

FIG. 3A is a cross-sectional view of a hinge unit of an electronic device in FIG. 2A taken along line A-A, and an enlarged view of the hinge unit in FIG. 3C according to an embodiment of the disclosure.

Figure 3B:
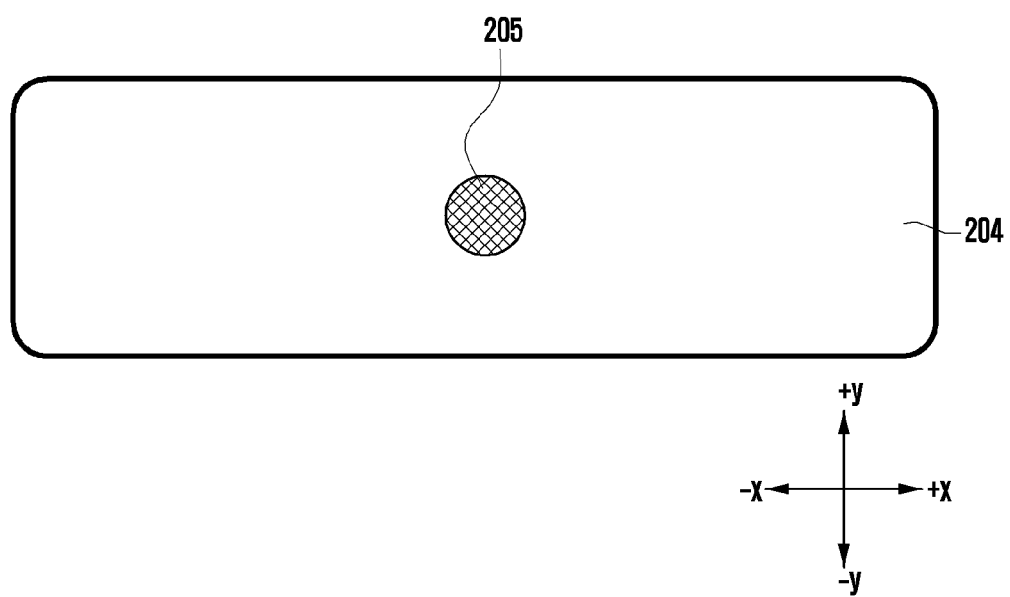
FIG. 3B is a plan view illustrating a third acoustic hole disposed at a hinge cover in a state in which an electronic device is folded according to an embodiment of the disclosure.

FIG. 3B is a plan view illustrating a third acoustic hole disposed at a hinge cover in a state (folding state) in which an electronic device is folded according to an embodiment of the disclosure.

FIG. 3C is a perspective view of a hinge unit in a state (unfolding state) in which an electronic device is unfolded according to an embodiment of the disclosure.

Referring to FIG. 3A, the connection part 212 of the flexible printed circuit board 211 may be disposed at the hinge unit 203. The connection part 212 may be disposed between the hinge unit 203 and a hinge cover 204. A hole 213 connected to a third microphone module 208 (e.g., the audio module 170 in FIG. 1) may be disposed at, at least a part of the connection part 212.

According to various embodiments, the third microphone module 208 may be disposed at the hinge unit 203. The third microphone module 208 may be electrically connected to the connection part 212 of the flexible printed circuit board 211 disposed at the hinge unit 203. According to an embodiment, the third microphone module 208 may be disposed at a first surface 212-1 of the connection part 212 to be electrically connected to the flexible printed circuit board 211. The third microphone module 208 may be disposed at the first surface 212-1 of the connection part 212 such that a microphone hole 209 is connected to the hole 213 disposed at the connection part 212. According to various embodiments, the third microphone module 208 may be disposed at a second surface 212-2 of the connection part 212 to be electrically connected to the flexible printed circuit board 211.

According to various embodiments, the hinge cover 204 may cover the hinge unit 203. At least a part of the hinge cover 204 may form the exterior of the electronic device 200 (e.g., the electronic device 101 in FIG. 1). An electronic component, an instrument, and the like arranged at the hinge unit 203 may be protected by the hinge cover 204. A space 204-1 for accommodating at least a part of the connection part 212 may be formed at the hinge cover 204.

According to various embodiments, a part of the hinge cover 204 may be exposed to the outside of the electronic device 200. For example, at least a part of the hinge cover 204 may form the exterior of the electronic device 200 when the electronic device 200 is in a state in the folding state or an intermediate state in which the first housing 201-1 and the second housing 201-2 form a predetermined angle.

According to various embodiments, a part of the hinge cover 204 may not be exposed to the outside of the electronic device 200. For example, when the state of the electronic device 200 is the unfolded state, at least a part of the hinge cover 204 may be covered by at least one of a first rear cover 202-1 coupled to the first housing 201-1 and a second rear cover 202-2 coupled to the second housing 201-2.

According to various embodiments, a third acoustic hole 205 may be disposed at the hinge cover 204. In an embodiment, the third acoustic hole 205 may be an opening formed at the hinge cover 204. In an embodiment, the external sound may be transferred to the third microphone module 208 via the third acoustic hole 205, the hole 213, and the microphone hole 209.

According to various embodiments, referring to FIG. 3A, a soundproof member 214 may be disposed between the hinge cover 204 and the connection part 212. A part of the space between the hinge cover 204 and the connection part 212 may be closed by the soundproof member 214. The sound received from the outside of the electronic device 200 through the third acoustic hole 205 may not leak sound to the space between the hinge cover 204 and the connection part 212 by the soundproof member 214. The third acoustic hole 205 formed at the hinge cover 204 may be included in one surface of the soundproof member 214, and the hole 213 formed at the connection part 212 may be included in the other surface positioned in a direction opposite to the one surface thereof. Referring to FIG. 4B, an internal space 214-3 may be formed at the soundproof member 214 to connect the third acoustic hole 205 and the hole 213. The external sound of the electronic device 200 may be transferred to the microphone hole 209 through the internal space 214-3 of the soundproof member 214 via the third acoustic hole 205 and the hole 213 of the connection part 212 without the leakage of the sound.

According to various embodiments, a fixing member 217 may be disposed at the hinge unit 203. The connection part 212 and the hinge cover 204 may be in close contact with the soundproof member 214 by the fixing member 217. The fixing member 217 may be attached to one surface of the connection part 212 to support the connection part 212. For example, the fixing member 217 may be coupled to the hinge cover 204 to support the connection part 212 in +Z direction in FIG. 3A. The detailed description for the fixing member 217 will be described later.

Referring to FIGS. 3B and 3C, the third acoustic hole 205 disposed at the hinge cover 204 may be exposed to the outside in a state in which the electronic device 200 is folded. The third acoustic hole 205 may be positioned at a predetermined gap formed between the first rear cover 202-1 and the second rear cover 202-2 in a state in which the electronic device 200 is unfolded.

According to an embodiment, referring to FIG. 3C, when the electronic device 200 has been unfolded, at least a part of the hinge cover 204 may be covered by the first rear cover 202-1 and the second rear cover 202-2. A predetermined gap may be formed between the first rear cover 202-1 and the second rear cover 202-2. The third acoustic hole 205 may be positioned at a gap formed between the first rear cover 202-1 and the second rear cover 202-2. The external sound of the electronic device 200 may be transferred to the third acoustic hole 205 through the gap formed between the first rear cover 202-1 and the second rear cover 202-2.

According to various embodiments, the third acoustic hole 205 formed at the hinge cover 204 may not be exposed to the outside of the electronic device 200. For example, the third acoustic hole 205 may be positioned between the first rear cover 202-1 and the hinge cover 204 or between the second rear cover 202-2 and the hinge cover 204 in a state in which the electronic device 200 is folded or unfolded. The external sound of the electronic device 200 may be transferred to the third acoustic hole 205 through a gap between the first rear cover 202-1 and the second rear cover 202-2. In addition, the third acoustic hole 205 may be disposed at various positions on the hinge cover 204.

The position of the third acoustic hole 205 illustrated in FIGS. 3A to 3C is merely an embodiment and the position is not limited to the position illustrated in FIGS. 3A to 3C. The position of the third acoustic hole 205 may be variously changed within a range in which those skilled in the art may implement the same.

Figure 4A:
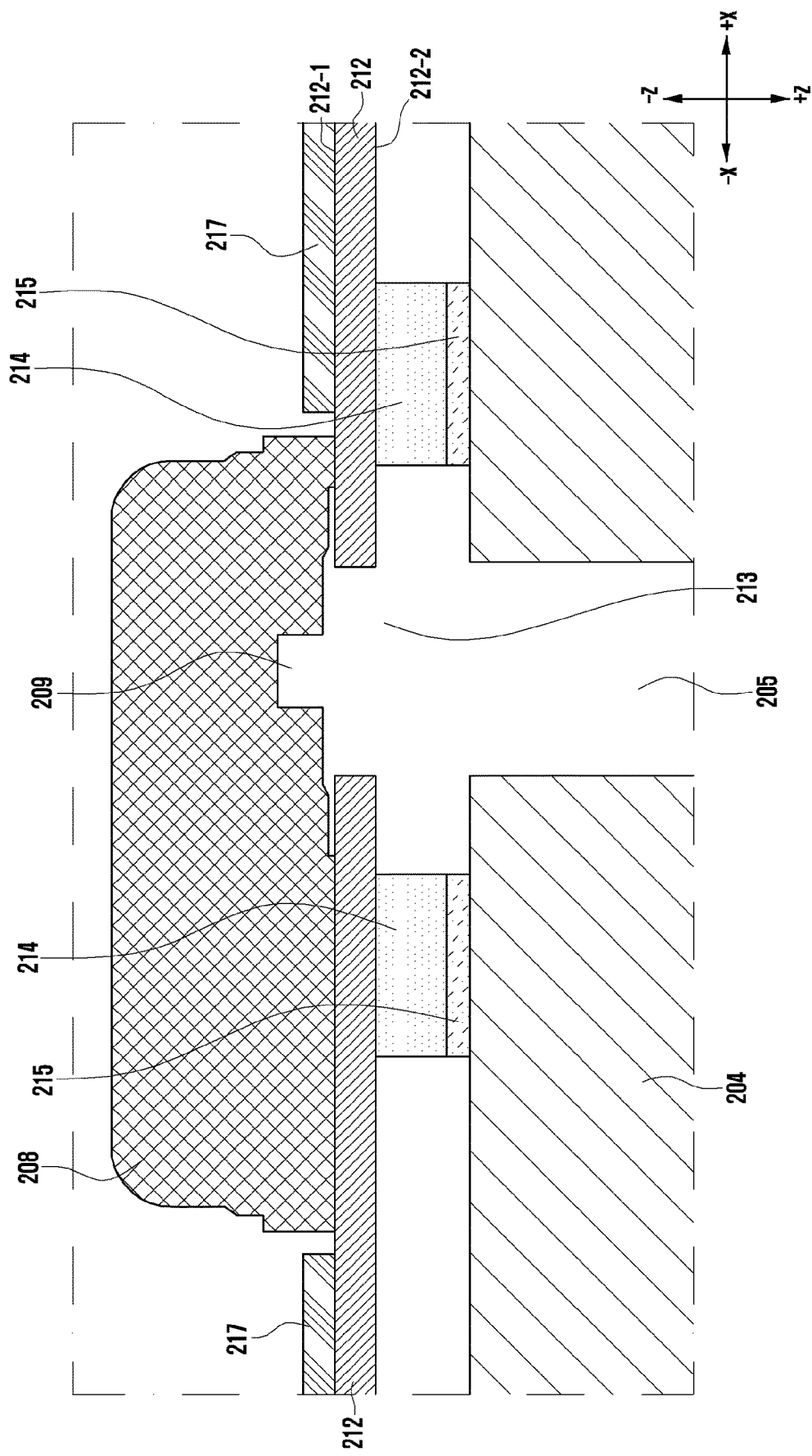
FIG. 4A is a plan view illustrating a state in which a soundproof member is attached to a hinge cover according to an embodiment of the disclosure.
Figure 4B:
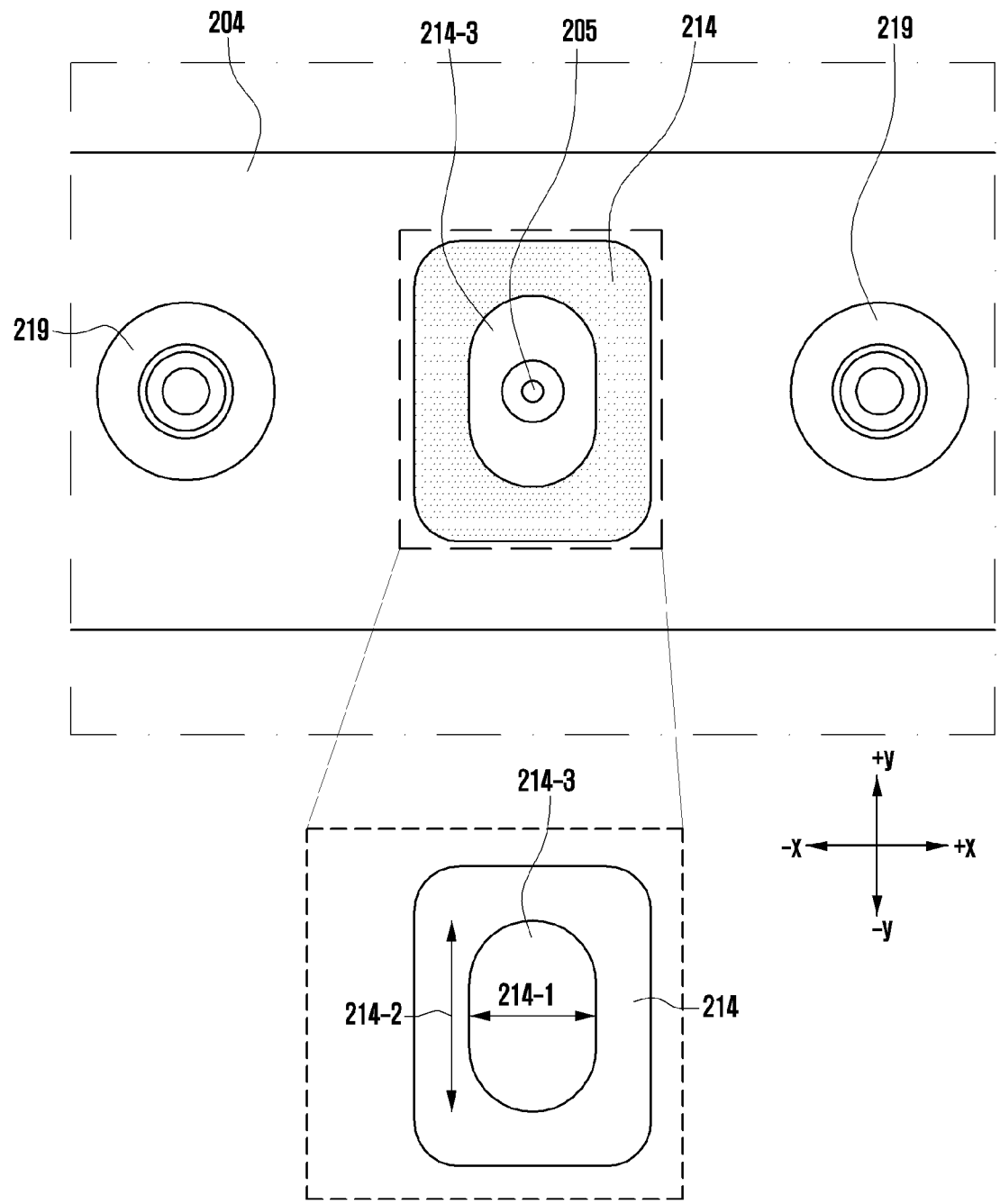
FIG. 4B is an enlarged plan view of the hinge cover in FIG. 4A according to an embodiment of the disclosure.

FIG. 4A is a plan view illustrating a state in which a soundproof member is attached to a hinge cover according to an embodiment of the disclosure.

FIG. 4B is an enlarged plan view of the hinge cover in FIG. 4A according to an embodiment of the disclosure.

Figure 4C:
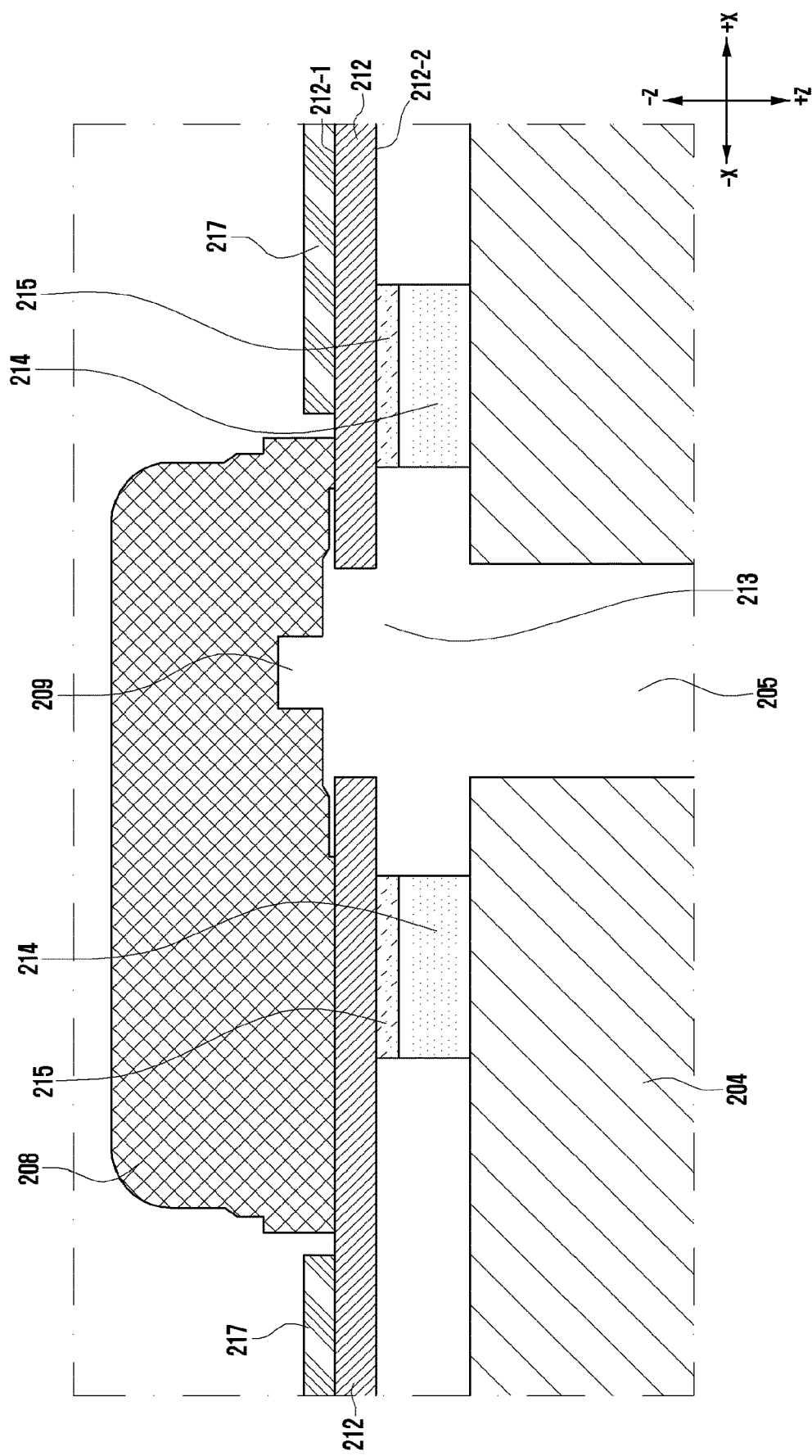
FIG. 4C is a plan view illustrating a state in which a soundproof member is attached to a connection part of a flexible printed circuit board according to an embodiment of the disclosure.

FIG. 4C is a plan view illustrating a state in which a soundproof member is attached to a connection part of a flexible printed circuit board according to an embodiment of the disclosure.

Figure 4D:
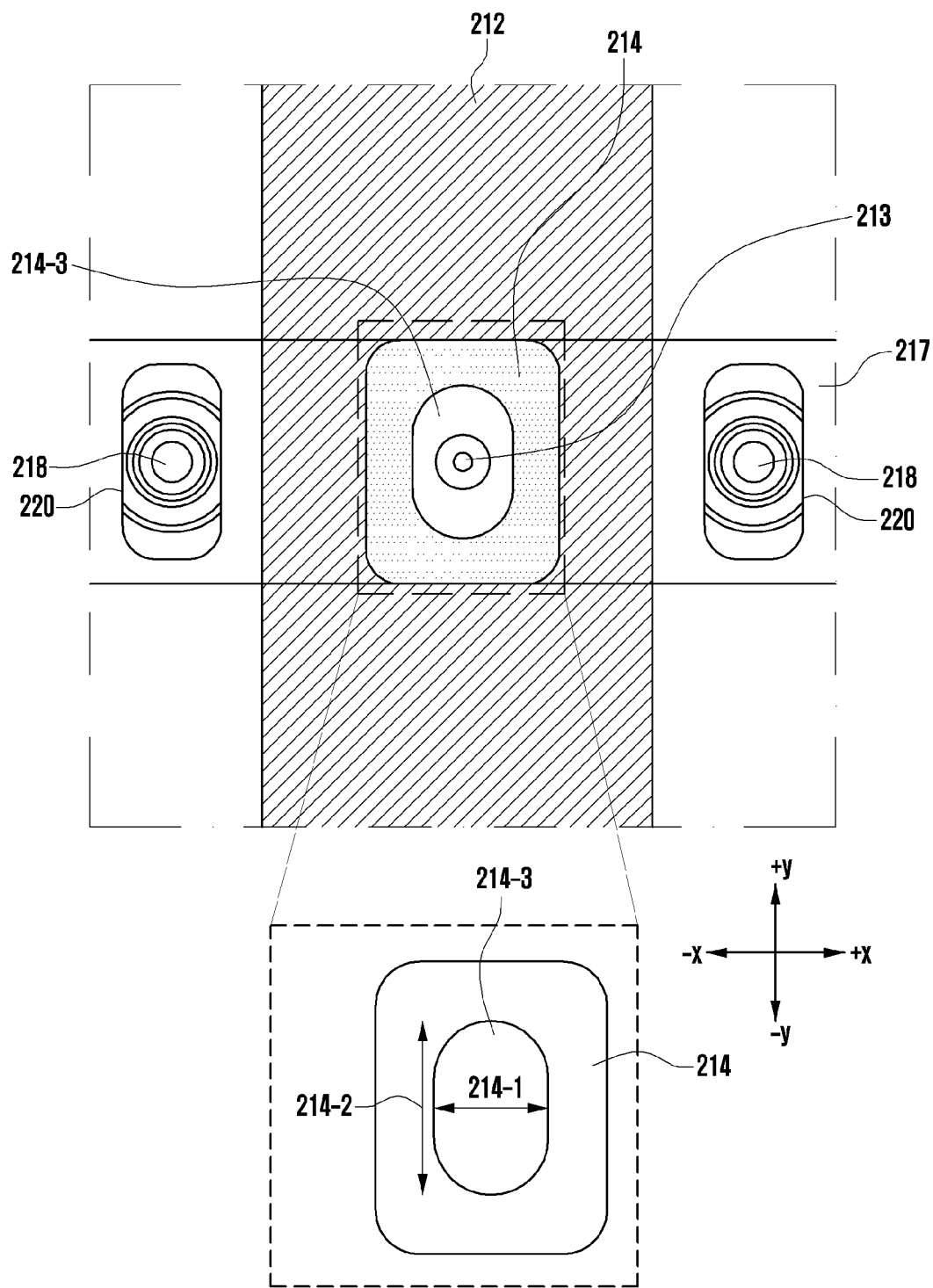
FIG. 4D is an enlarged plan view of the connection part in FIG. 4C according to an embodiment of the disclosure.

FIG. 4D is an enlarged plan view of the connection part in FIG. 4C according to an embodiment of the disclosure.

Figure 4E:
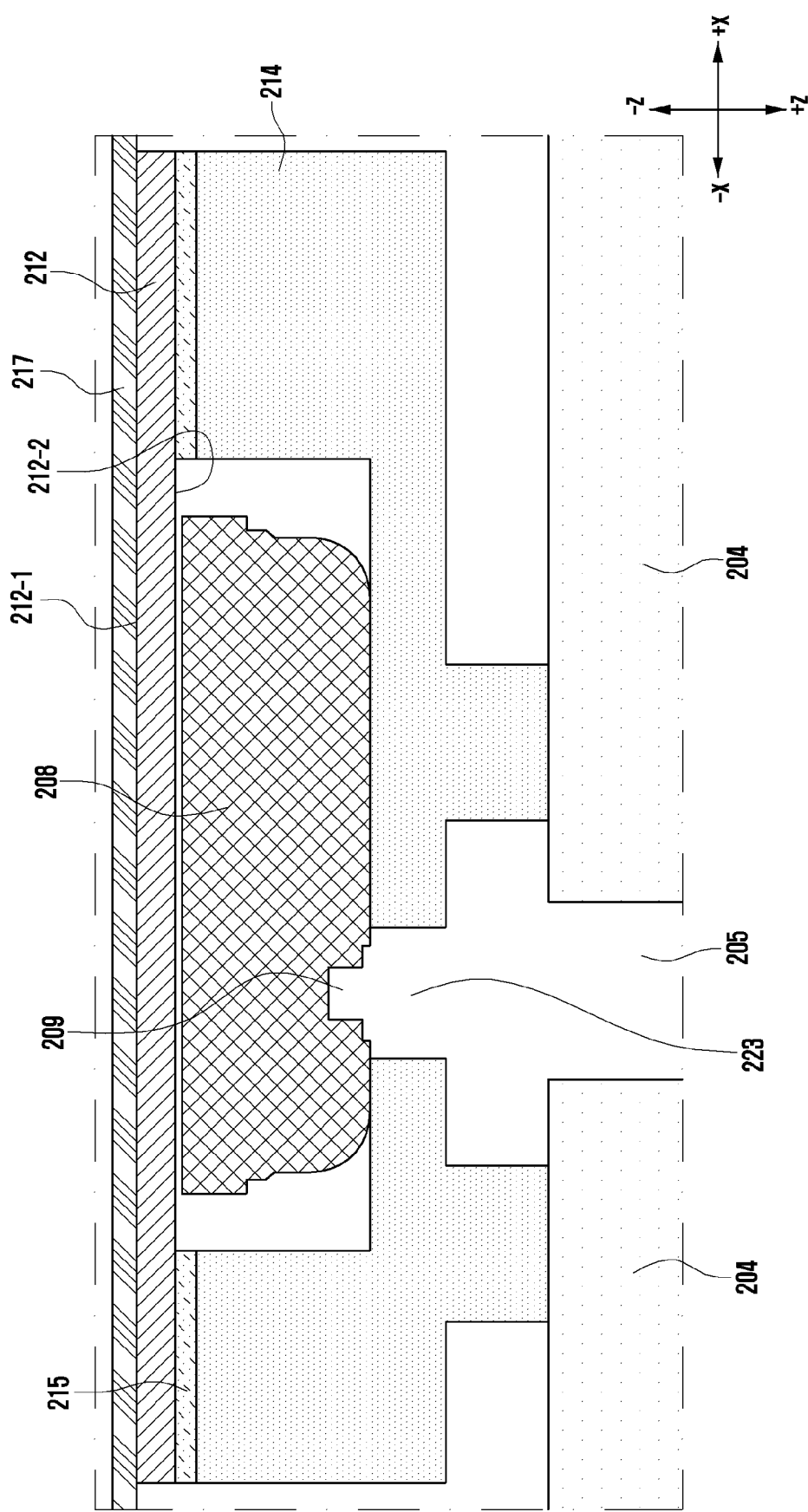
FIG. 4E is a plan view of a state in which a soundproof member is disposed between a hinge cover and a connection part to cover a third microphone module according to an embodiment of the disclosure.

FIG. 4E is a plan view of a state in which the soundproof member is disposed between the hinge cover and the connection part to cover the third microphone module according to an embodiment of the disclosure.

Referring to FIGS. 4A and 4B, the soundproof member 214 may be disposed between the connection part 212 and the hinge cover 204. The soundproof member 214 may be attached to only one of the connection part 212 and the hinge cover 204. According to an embodiment, one surface of the soundproof member 214 may be attached to the hinge cover 204 and the other surface of the soundproof member 214 may face the connection part 212. One surface of the soundproof member 214 may be attached to the hinge cover 204 such that the third acoustic hole 205 formed at the hinge cover 204 is included therein. The other surface of the soundproof member 214 may face the connection part 212 such that the hole 213 of the connection part 212 is included therein. The third acoustic hole 205 and the hole 213 of the connection part 212 may be connected via the internal space 214-3 of the soundproof member 214.

According to various embodiments, a first adhesive member 215 may be disposed between one surface of the soundproof member 214 and the hinge cover 204. One surface of the soundproof member 214 may be attached to the hinge cover 204 via the first adhesive member 215. In addition, the soundproof member 214 may be fixed to the hinge cover 204 in various ways such as a heat fusion.

According to various embodiments, in the flexible printed circuit board 211, when the second housing 201-2 rotates with respect to the first housing 201-1 in a state in which the first part 211-1 is fixed to the first housing 201-1 and the second part 211-2 is fixed to the second housing 201-2, the connection part 212 of the flexible printed circuit board 211 may be deformed. The deformation of the flexible printed circuit board 211 may be understood as the movement with respect to the fixed elements. The hole 213 formed at the connection part 212 by the movement of the connection part 212 may change the relative position by a first displacement with respect to the third acoustic hole 205 disposed at the hinge cover 204. The first displacement may include a displacement in a first axial direction (e.g., an X axis in FIG. 4B) and a displacement in a second axial direction (e.g., a Y axis in FIG. 4B) perpendicular to the first axial direction.

According to various embodiments, the relative position between the hole 213 disposed at the connection part 212 and the third acoustic hole 205 disposed at the hinge cover 204 may be changed by the movement of the connection part 212. The size of the internal space 214-3 of the soundproof member 214 may be determined such that, even when the hole 213 changes the relative position by the first displacement with respect to the third acoustic hole 205, the hole 213 and the third acoustic hole 205 are connected to each other by the internal space 214-3 of the soundproof member 214. For example, the internal space 214-3 of the soundproof member 214 may be configured to include a first length 214-1 corresponding to a maximum displacement in the first axial direction or greater than the maximum displacement in the first axial direction and a second length 214-2 corresponding to a maximum displacement in the second axial direction or greater than the maximum displacement in the second axial direction. Therefore, the third acoustic hole 205 and the hole 213 of the connection part 212 may be connected via the internal space 214-3 of the soundproof member 214.

Referring to FIGS. 4C and 4D, the soundproof member 214 may be disposed between the connection part 212 and the hinge cover 204. According to an embodiment, one surface of the soundproof member 214 may face the hinge cover 204 and the other surface of the soundproof member 214 may be attached to the connection part 212. One surface of the soundproof member 214 may face the hinge cover 204 such that the third acoustic hole 205 disposed at the hinge cover 204 is included therein. The other surface of the soundproof member 214 may be attached to the connection part 212 such that the hole 213 of the connection part 212 is included therein. The third acoustic hole 205 and the hole 213 of the connection part 212 may be connected via the internal space 214-3 of the soundproof member 214.

According to various embodiments, the first adhesive member 215 may be disposed between the other surface of the soundproof member 214 and the connection part 212. The other surface of the soundproof member 214 may be attached to the connection part 212 via the first adhesive member 215. In addition, the soundproof member 214 may be fixed to the connection part 212 in various ways such as a heat fusion.

According to various embodiments, in the flexible printed circuit board 211, when the second housing 201-2 rotates with respect to the first housing 201-1 in a state in which the first part 211-1 is fixed to the first housing 201-1 and the second part 211-2 is fixed to the second housing 201-2, the connection part 212 of the flexible printed circuit board 211 may be deformed. The deformation of the flexible printed circuit board 211 may be understood as the movement with respect to the fixed elements. The third acoustic hole 205 formed at the hinge cover 204 by the movement of the connection part 212 may change the relative position by a second displacement with respect to the hole 213 disposed at the connection part 212. The second displacement may include a displacement in a first axial direction (e.g., an X axis in FIG. 4D) and a displacement in a second axial direction (e.g., a Y axis in FIG. 4D) perpendicular to the first axial direction.

According to various embodiments, the relative position between the hole 213 disposed at the connection part 212 and the third acoustic hole 205 disposed at the hinge cover 204 may be changed by the movement of the connection part 212. The size of the internal space 214-3 of the soundproof member 214 may be determined such that, even when the third acoustic hole 205 changes the relative position by the second displacement with respect to the hole 213, the hole 213 and the third acoustic hole 205 are connected to each other by the internal space 214-3 of the soundproof member 214. For example, the internal space 214-3 of the soundproof member 214 may be configured to include the first length 214-1 corresponding to the maximum displacement in the first axial direction or greater than the maximum displacement in the first axial direction and the second length 214-2 corresponding to the maximum displacement in the second axial direction or greater than the maximum displacement in the second axial direction. Therefore, the third acoustic hole 205 and the hole 213 of the connection part 212 may be connected via the internal space 214-3 of the soundproof member 214.

Referring to FIG. 4E, the third microphone module 208 may be disposed at the second surface 212-2 of the connection part 212 to be electrically connected to the flexible printed circuit board 211.

According to various embodiments, referring to FIG. 4E, the soundproof member 214 may be disposed between the hinge cover 204 and the connection part 212 to cover the third microphone module 208. The soundproof member 214 may be attached to the hinge cover 204 or the second surface 212-2 of the connection part 212. A duct 223 configured to connect the microphone hole 209 of the microphone module 208 and the third acoustic hole 205 may be disposed at the soundproof member 214. The external sound of the electronic device 200 may be transferred to the microphone hole 209 via the third acoustic hole 205 and the duct 223 of the soundproof member 214.

According to various embodiments, one surface of the soundproof member 214 may be attached to the hinge cover 204 and the other surface of the soundproof member may face the connection part 212. One surface of the soundproof member 214 may be attached to the hinge cover 204 such that the third acoustic hole 205 disposed at the hinge cover 204 and the duct 223 of the soundproof member 214 are connected to each other. The other surface of the soundproof member 214 may face the connection part 212 to cover the third microphone module 208. The third acoustic hole 205 and the microphone hole 209 of the microphone module 208 may be connected to each other via the duct 223 of the soundproof member 214.

According to various embodiments, the first adhesive member 215 may be disposed between one surface of the soundproof member 214 and the hinge cover 204. One surface of the soundproof member 214 may be attached to the hinge cover 204 via the first adhesive member 215. In addition, the soundproof member 214 may be fixed to the hinge cover 204 in various ways such as a heat fusion.

According to various embodiments, in the flexible printed circuit board 211, when the second housing 201-2 rotates with respect to the first housing 201-1 in a state in which the first part 211-1 is fixed to the first housing 201-1 and the second part 211-2 is fixed to the second housing 201-2, the connection part 212 of the flexible printed circuit board 211 may be deformed. The deformation of the flexible printed circuit board 211 may be understood as the movement with respect to the fixed elements. The microphone hole 209 of the third microphone module 208 connected to the connection part 212 by the movement of the connection part 212 may change the relative position by a third displacement with respect to the duct 223 of the soundproof member 214. The third displacement may include a displacement in the first axial direction (e.g., the X axis in FIG. 4B) and a displacement in the second axial direction (e.g., the Y axis in FIG. 4B) perpendicular to the first axial direction.

According to various embodiments, the relative position between the microphone hole 209 and the duct 223 of the soundproof member 214 may be changed by the movement of the connection part 212. The size of the duct 223 of the soundproof member 214 may be determined such that, even when the microphone hole 209 changes the relative position by the third displacement with respect to the duct 223, the microphone hole 209 and the duct 223 are connected to each other. For example, the duct 223 of the soundproof member 214 may be configured to include the first length 214-1 corresponding to the maximum displacement in the first axial direction or greater than the maximum displacement in the first axial direction and the second length 214-2 corresponding to the maximum displacement in the second axial direction or greater than the maximum displacement in the second axial direction.

According to various embodiments, referring to FIG. 4E, one surface of the soundproof member 214 may face the hinge cover 204 and the other surface of the soundproof member may be attached to the connection part 212. One surface of the soundproof member 214 may face the hinge cover 204 such that the third acoustic hole 205 disposed at the hinge cover 204 and the duct 223 of the soundproof member 214 are connected to each other. The other surface of the soundproof member 214 may be attached to the connection part 212 to cover the third microphone module 208. The third acoustic hole 205 and the microphone hole 209 of the microphone module 208 may be connected to each other via the duct 223 of the soundproof member 214.

According to various embodiments, the first adhesive member 215 may be disposed between the connection part 212 and the other surface of the soundproof member 214. The other surface of the soundproof member 214 may be attached to the connection part 212 via the first adhesive member 215. In addition, the soundproof member 214 may be fixed to the hinge cover 204 in various ways such as a heat fusion.

According to various embodiments, in the flexible printed circuit board 211, when the second housing 201-2 rotates with respect to the first housing 201-1 in a state in which the first part 211-1 is fixed to the first housing 201-1 and the second part 211-2 is fixed to the second housing 201-2, the connection part 212 of the flexible printed circuit board 211 may be deformed. The deformation of the flexible printed circuit board 211 may be understood as the movement with respect to the fixed elements. The third acoustic hole 205 formed at the hinge cover 204 by the movement of the connection part 212 may change the relative position by a fourth displacement with respect to the duct 223 of the soundproof member 214. The fourth displacement may include the displacement in the first axial direction (e.g., the X axis in FIG. 4D) and the displacement in the second axial direction (e.g., the Y axis in FIG. 4D) perpendicular to the first axial direction.

According to various embodiments, the relative position between the third acoustic hole 205 and the duct 223 of the soundproof member 214 may be changed by the movement of the connection part 212. The size of the duct 223 of the soundproof member 214 may be determined such that, even when the third acoustic hole 205 changes the relative position by the fourth displacement with respect to the duct 223, the third acoustic hole 205 and the duct 223 are connected to each other. For example, the duct 223 of the soundproof member 214 may be configured to include the first length 214-1 corresponding to the maximum displacement in the first axial direction or greater than the maximum displacement in the first axial direction and the second length 214-2 corresponding to the maximum displacement in the second axial direction or greater than the maximum displacement in the second axial direction.

The first displacement, the second displacement, the third displacement, and the fourth displacement which are used for describing examples illustrated in FIGS. 4A to 4E may mean substantially identical degree of displacements and a degree of the movement occurred at the connection part in each example may not be different.

According to various embodiments, when the soundproof member 214 is attached to both the hinge cover 204 and the connection part 212, the connection part 212 may be fixed to the hinge cover 204 by the soundproof member 214. Therefore, the connection part 212 is fixed and cannot move corresponding to the movement occurred at the connection part 212, and thus may be damaged. The connection part 212 according to various embodiments disclosed herein may move corresponding to the movement occurred at the hinge unit 203 as the soundproof member 214 is attached to the hinge cover 204 or the connection part 212. Therefore, the connection part 212 may not be damaged.

According to various embodiments, the soundproof member 214 may be manufactured in various shapes. The shape of the soundproof member 214, the first length 214-1, and the second length 214-2 which are illustrated in FIGS. 4B and 4D are merely examples and are not limited to the shape illustrated in FIGS. 4B, 4D, and 4E.

According to various embodiments, the soundproof member 214 may be made of various materials. For example, the soundproof member 214 may be made of rubber and urethane. In addition, the soundproof member 214 may be made of various materials and in various shapes.

The position of the third acoustic hole 205 illustrated in FIGS. 4A to 4E is merely an embodiment, the position is not limited to the position illustrated in FIGS. 4A to 4E. The position of the third acoustic hole 205 may be variously changed within a range in which those skilled in the art may implement the same.

Figure 5A:
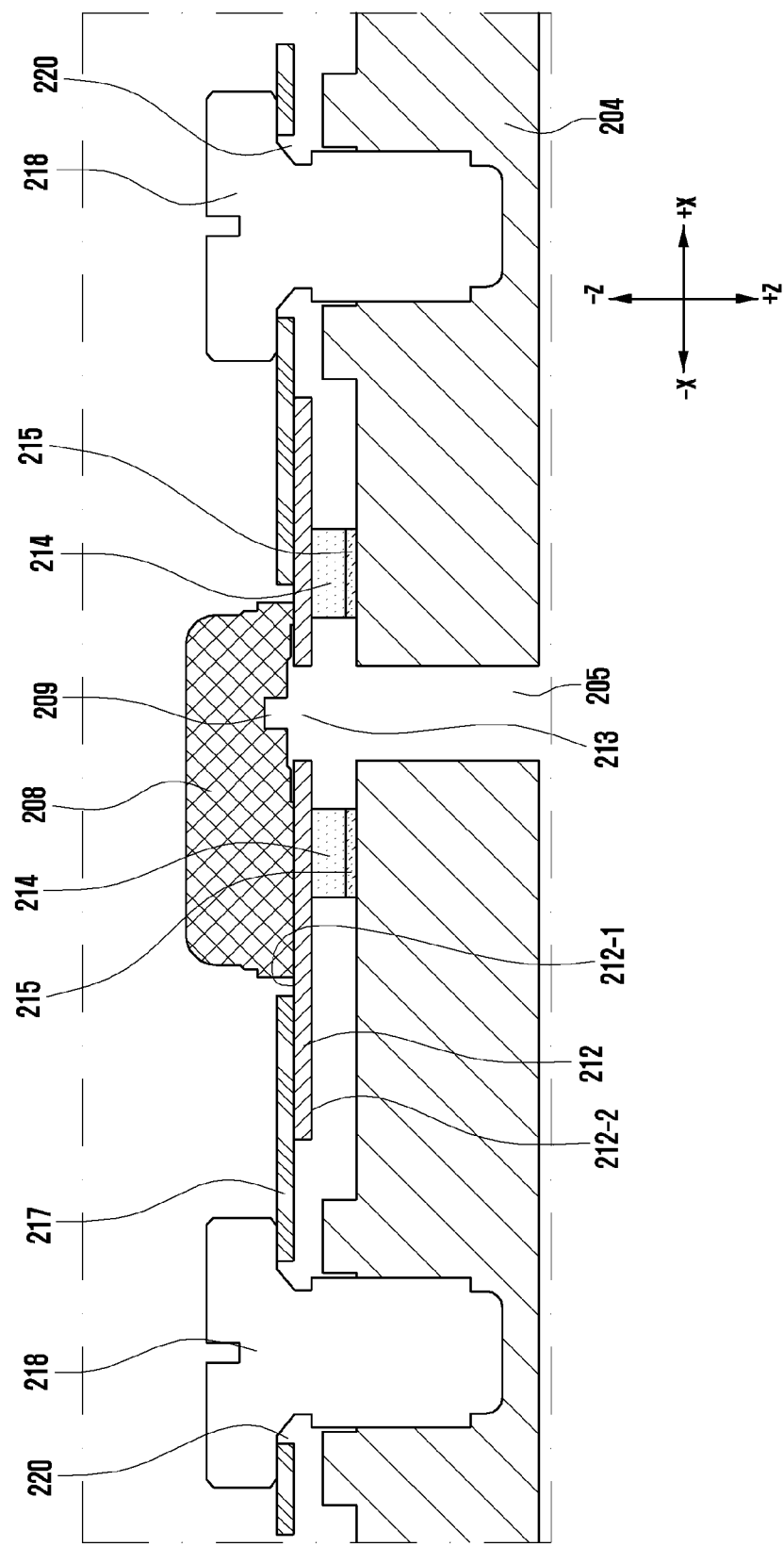
FIG. 5A is a plan view illustrating a state in which a fixing member is attached to a first surface of a connection part of a flexible printed circuit board according to an embodiment of the disclosure.

FIG. 5A is a plan view illustrating a state in which a fixing member is attached to a first surface of a connection part of a flexible printed circuit board according to an embodiment of the disclosure.

Figure 5B:
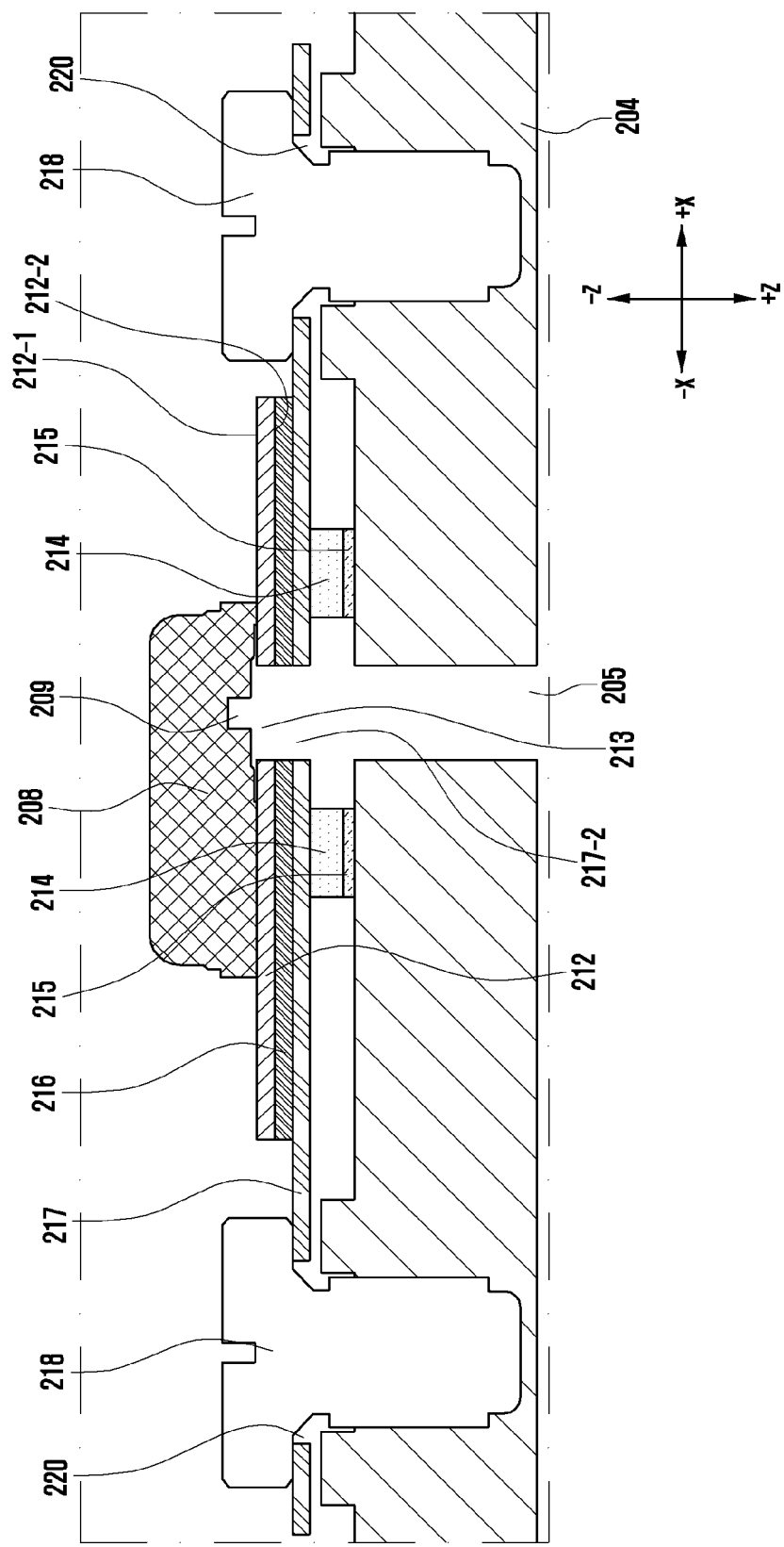
FIG. 5B is a plan view illustrating a state in which a fixing member is attached to a second surface of a connection part of a flexible printed circuit board according to an embodiment of the disclosure.

FIG. 5B is a plan view illustrating a state in which a fixing member is attached to a second surface of a connection part of a flexible printed circuit board according to an embodiment of the disclosure.

Figure 5C:
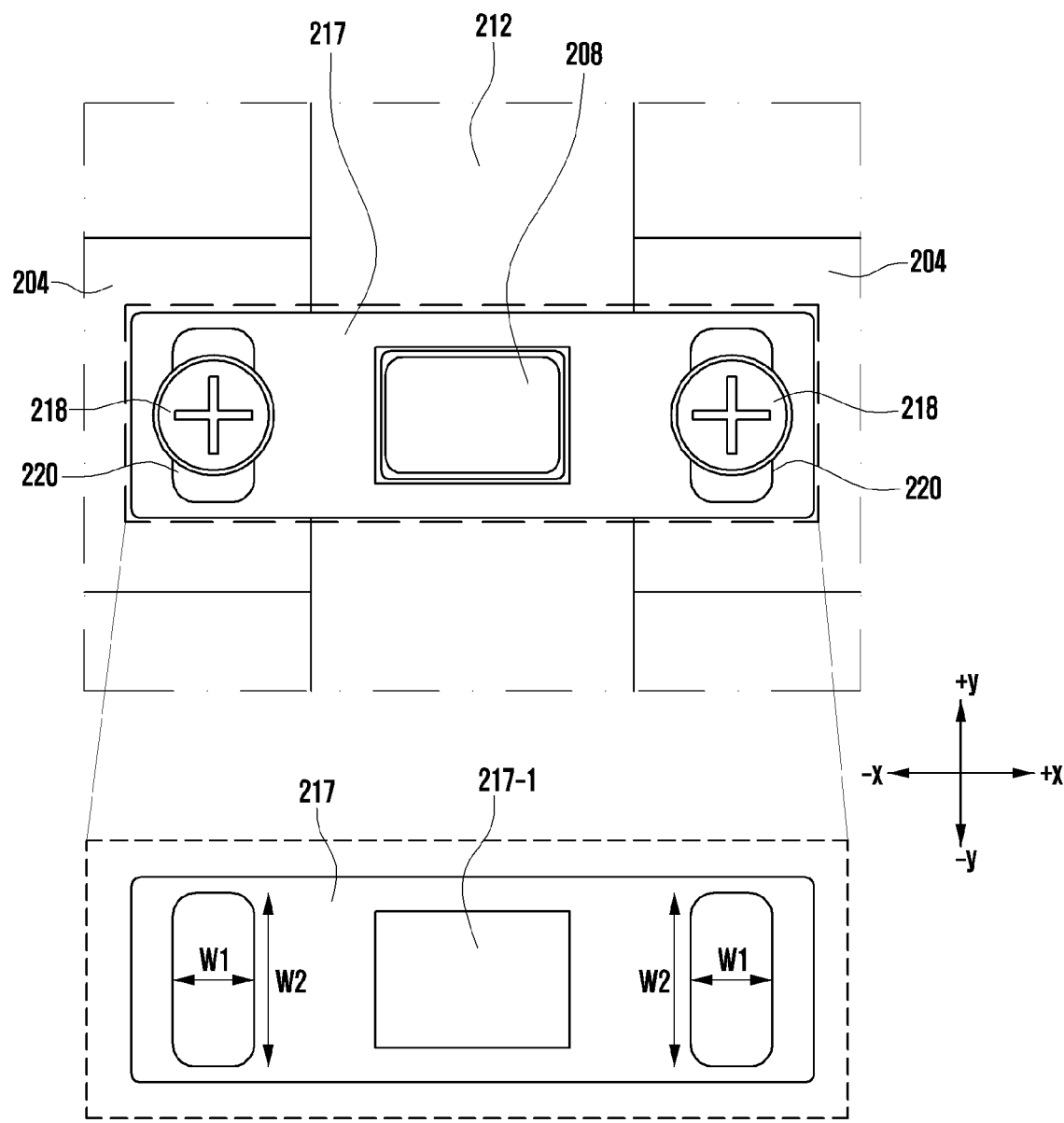
FIG. 5C is a plan view illustrating a fixing member according to an embodiment of the disclosure.

FIG. 5C is a plan view illustrating a fixing member according to an embodiment of the disclosure.

Figure 5D:
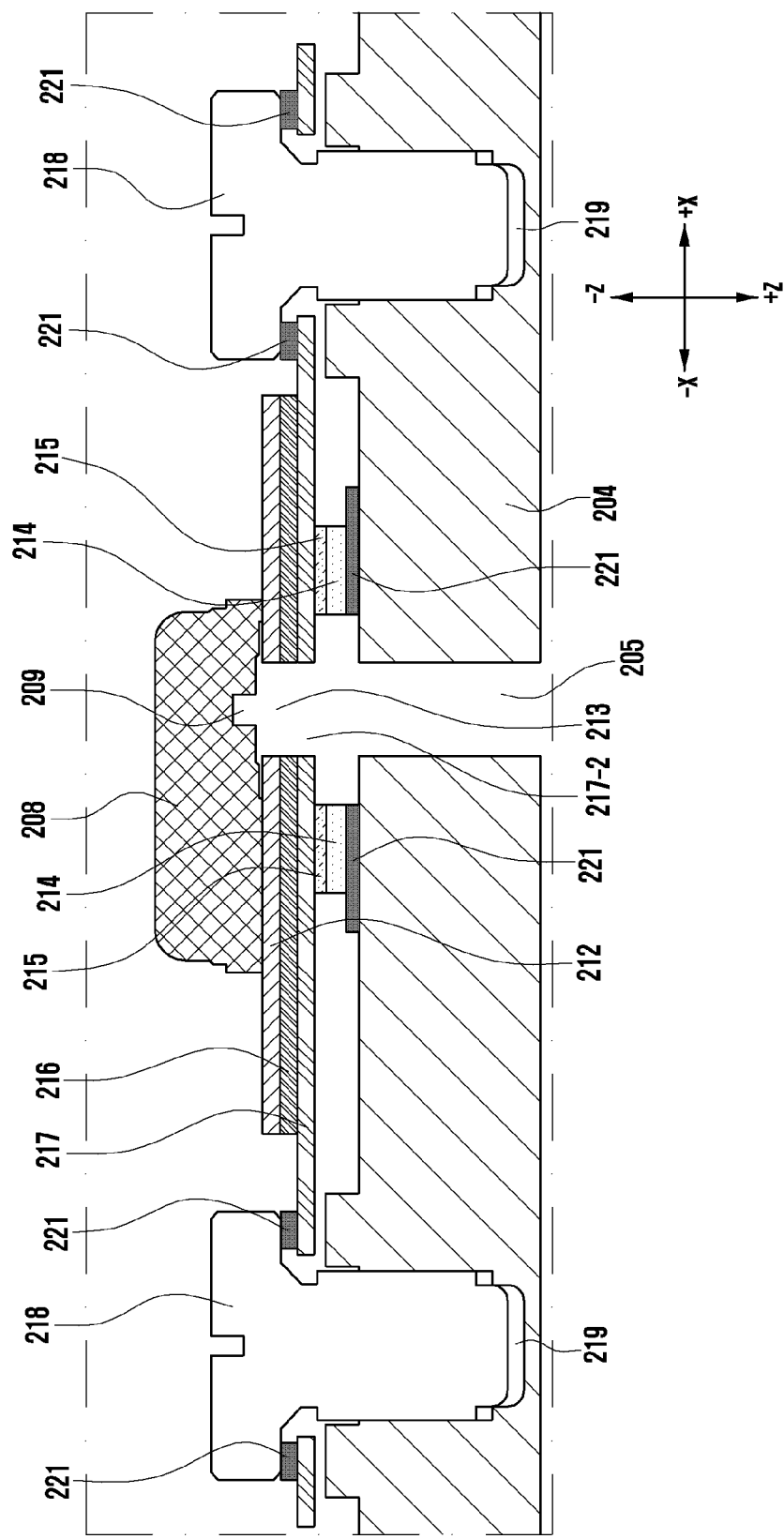
FIG. 5D is a plan view of an electronic device in which a slip member is disposed at a hinge unit of the electronic device according to an embodiment of the disclosure.

FIG. 5D is a plan view of an electronic device in which a slip member is disposed at a hinge unit of the electronic device according to an embodiment of the disclosure.

Referring to FIGS. 5A to 5D, the connection part 212 and the hinge cover 204 may be in close contact with the soundproof member 214 by the fixing member 217. The fixing member 217 may support the connection part 212 in the +Z direction in FIG. 5A to maintain sealing between the hinge cover 204 and the connection part 212 even when the movement occurs at the connection part 212.

According to various embodiments, the fixing member 217 may be attached to one surface of the connection part 212 to support the connection part 212.

Referring to FIG. 5A, the fixing member 217 may be attached to the first surface 212-1 of the connection part 212. Referring to FIG. 5C, a first opening 217-1 at which at least a part of the connection part 212 is exposed may be disposed at the fixing member 217. The third microphone module 208 may be electrically connected to the first surface 212-1 of the connection part 212 exposed through the first opening 217-1.

Referring to FIG. 5B, the fixing member 217 may be attached to the second surface 212-2 of the connection part 212. A second opening 217-2 may be disposed at the fixing member 217. The second opening 217-2 may allow the hole 213 of the connection part 212 connected to the microphone hole 209 not to be covered by the fixing member 217. The second opening 217-2 may be connected to the hole 213 disposed at the connection part 212. Therefore, the external sound of the electronic device 200 (e.g., the electronic device 101 in FIG. 1) may be transferred to the microphone hole 209 via the third acoustic hole 205, the second opening 217-2, and the hole 213 disposed at the connection part 212.

According to various embodiments, the fixing member 217 may be attached to the connection part 212 via a second adhesive member 216 disposed between the fixing member 217 and the connection part 212. In addition, the fixing member 217 may be fixed to the connection part 212 in various ways.

According to various embodiments, referring to FIGS. 5A to 5D, the fixing member 217 may be coupled to the hinge cover 204. The fixing member 217 may be coupled to the hinge cover 204 via a connection member 218 which extends through a first fixing hole 219 disposed at the hinge cover 204 and a second fixing hole 220 disposed at the fixing member 217. As the fixing member 217 is coupled to the hinge cover 204, the connection part 212 and the hinge cover 204 may be in close contact with the soundproof member 214. Even when the movement occurs at the connection part 212, the connection part 212 and the hinge cover 204 may be in close contact with the soundproof member 214 by the fixing member 217. In an embodiment, the connection member 218 may be a bolt. In this case, a screw thread configured to guide a coupling of the bolt may be disposed inside at least one of the first fixing hole 219 and the second fixing hole 220 through which the connection member 218 extends. In addition, the fixing member 217 may be coupled to the hinge cover 204 in various ways such as soldering and heat fusion.

In an embodiment, the fixing member 217 may be coupled to a separate instrument (not illustrated) disposed in the hinge unit 203. The fixing member 217 may be coupled to the instrument via the connection member 218 extending through the second fixing hole 220 disposed at the fixing member 217 and a third fixing hole (not illustrated) disposed at the instrument. As the fixing member 217 is coupled to the instrument, the connection part 212 and the hinge cover 204 may be in close contact with the soundproof member 214. In addition, the fixing member 217 may be coupled to the hinge cover 204 in various ways such as soldering and heat fusion.

In an embodiment, the connection member 218 may be bolt-coupled to the first fixing hole 219 via the second fixing hole 220. Referring to FIG. 5C, the second fixing hole 220 disposed at the fixing member 217 may be formed to be larger than the cross-section of the connection member 218. Accordingly, the fixing member 217 may move with respect to the connection member 218 bolt-coupled to the first fixing hole 219. Since the connection member 218 allows the movement of the fixing member 217, the fixing member 217 fixed to the connection part 212 also may move according to the movement of the connection part 212.

According to various embodiments, the movement of the fixing member 217 with respect to the connection member 218 may be limited by the size of the second fixing hole 220. For example, referring to FIG. 5C, the fixing member 217 may move in a first area W1 of the second fixing hole 220 in the X-axis direction in FIG. 5C and may move in a second area W2 of the second fixing hole 220 in the Y-axis direction in FIG. 5C. Since the movement of the fixing member 217 is limited by the size of the second fixing hole 220, the movement of the connection part 212 fixed to the fixing member 217 also may be limited.

According to various embodiments, the movement in Z-axis direction (e.g., Z-axis direction in FIG. 3A) occurred at the connection part 212 may be limited as the fixing member 217 is coupled to the instrument or the hinge cover 204 via the connection member 218.

According to various embodiments disclosed herein, the movement in the X-axis direction and the movement in the Y-axis direction occurred at the connection part 212 may be limited via the second fixing hole 220 disposed at the fixing member 217. As the fixing member 217 supports the connection part 212 in +Z direction as illustrated in FIG. 3A, the connection part 212 and the hinge cover 204 may be in close contact with the soundproof member 214 to maintain sealing. Even when the fixing member 217 is coupled to the instrument or the hinge cover 204 in other ways such as soldering and heat fusion, not using the connection member 218, the same effect may be obtained.

According to various embodiments, the fixing member 217 may be formed of a material having at least a predetermined strength. The fixing member 217 may be formed of a material having a strength greater than that of the connection part 212. The fixing member 217 may be formed of various materials such as a metal material and/or a non-metal material. The metal material may include an alloy such as aluminum, stainless steel (STS and SUS), iron, magnesium, titanium, and the like, and the non-metal material may include synthetic resin, ceramic, and engineering plastic.

According to various embodiments, referring to FIG. 5D, a slip member 221 configured to reduce friction due to the movement of the connection part 212 may be disposed at the hinge unit 203. According to an embodiment, when the soundproof member 214 is attached to the hinge cover 204, the slip member 221 may be disposed in at least one of a space between the connection member 218 and the fixing member 217 and a space between the soundproof member 214 and the connection part 212. The friction between the connection member 218 and the fixing member 217 and between the soundproof member 214 and the connection part 212 which may occur due to the movement of the connection part 212 may be reduced via the slip member 221.

According to various embodiments, when the soundproof member 214 is attached to the connection part 212, the slip member 221 may be disposed between the connection member 218 and the fixing member 217 and between the soundproof member 214 and the hinge cover 204. The friction between the connection member 218 and the fixing member 217 and between the soundproof member 214 and the hinge cover 204 which may occur due to the movement of the connection part 212 may be reduced via the slip member 221.

The position of the third acoustic hole 205 illustrated in FIGS. 5A, 5B, and 5D is merely an embodiment and the position is not limited to the position illustrated in FIGS. 5A, 5B, and 5D. The position of the third acoustic hole 205 may be variously changed within a range in which those skilled in the art may implement the same.

Figure 6:
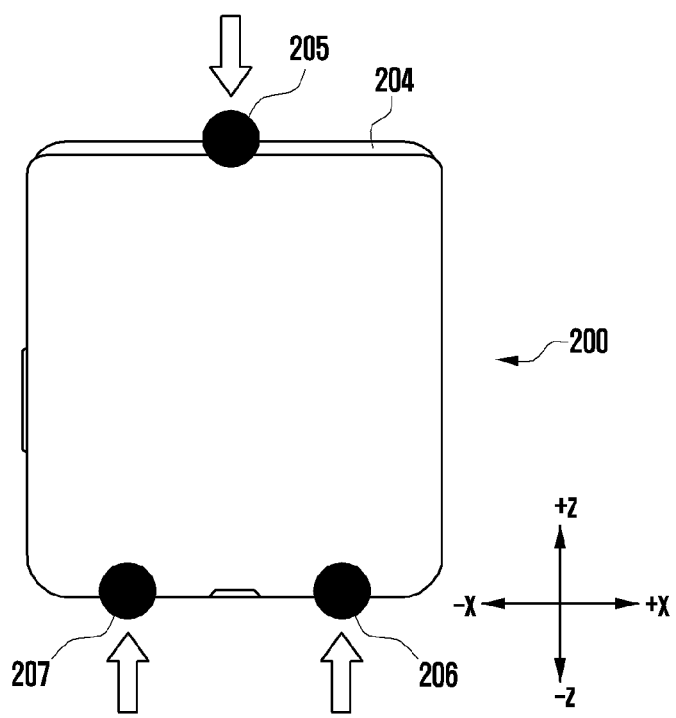
FIG. 6 is a view for illustrating a recording operation and a call operation of an electronic device according to an embodiment of the disclosure.

FIG. 6 is a view for illustrating a recording operation and a call operation of an electronic device according to an embodiment of the disclosure.

Referring to FIG. 6, in a call operation, a user may perform a call operation in a speaker mode in a state in which the electronic device 200 (e.g., the electronic device 101 in FIG. 1) is unfolded. When calling in the speaker mode, a calling sound of a received call may be transferred to a user by using at least one of a first sound output device (e.g., the sound output module 155 in FIG. 1) disposed at the first housing 201-1 and a second sound output device (e.g., the sound output module 155 in FIG. 1) disposed at the second housing 201-2. In this case, in order to transfer a voice of the user to another party, the voice of the user may be recognized by at least one of a first microphone module (e.g., the audio module 170 in FIG. 1), a second microphone module (e.g., the audio module 170 in FIG. 1), and a third microphone module 208 (e.g., the audio module 170 in FIG. 1) arranged at the electronic device 200.

According to various embodiments, in a call operation, the user may perform the call operation in the speaker mode in a state in which the electronic device 200 is folded. When the electronic device 200 has been folded, the speaker hole 210 through which the calling sound of the received call is emitted may be disposed in −Z direction in FIG. 6. The third acoustic hole 205 connected to the third microphone module 208 may be disposed to be spaced apart from the speaker hole 210 and may be disposed in the +Z direction in FIG. 6 which is opposite to the position of the speaker hole 210. When calling in the speaker mode, the first microphone module, the second microphone module, and the third microphone module 208 arranged at the electronic device 200 may be used. Especially, the third microphone module 208 connected to the third acoustic hole 205 furthest from the speaker hole 210 may be used as a main microphone module. The meaning that the third microphone module 208 is used as the main microphone module may mean that, although all of the first microphone module to the third microphone module 208 are used when calling in the speaker mode, the third microphone module 208 plays the most important role. In various embodiments disclosed herein, when calling in the speaker mode in a state in which the electronic device 200 is folded, the third acoustic hole 205 connected to the third microphone module 208, which is a main microphone module, and the speaker hole 210 are arranged to be furthest from each other so that the sound introduced into the third acoustic hole 205 is reduced and thus the call quality may be improved.

According to various embodiments, a user may perform a call operation in a normal calling mode in a state in which the electronic device 200 is folded. In the call operation, the calling sound of the received call may be transferred to the user via the speaker hole 210. In an embodiment, the speaker hole 210 may be a receiver for a call. The mouth of a user may be adjacent to the third acoustic hole 205 in the operation of calling while the user holds the folded electronic device 200. The voice of a user may be recognized by the third microphone module 208 via the third acoustic hole 205. In various embodiments disclosed herein, the third acoustic hole 205 connected to the third microphone module 208, which is a main microphone module, and the speaker hole 210 are arranged to be furthest from each other so that the sound introduced into the third acoustic hole 205 is reduced and thus the call quality may be improved.

According to various embodiments, a recording function may be used in a state in which the electronic device 200 is folded. When using the recording function, the external sound may be transferred into the electronic device 200 by the first acoustic hole 206, the second acoustic hole 207, and the third acoustic hole 205.

Referring to FIG. 6, the first acoustic hole 206 disposed at the top side of the first housing 201-1 and the second acoustic hole 207 disposed at the bottom side of the second housing 201-2 may be positioned on the same plane as the electronic device is folded such that the first housing 201-1 and the second housing 201-2 face each other. The third acoustic hole 205 disposed at the hinge cover 204 may positioned to be spaced apart from the first acoustic hole 206 and the second acoustic hole 207 in the opposite direction. According to various embodiments disclosed herein, a stereo recording may be possible as the external sound is transferred into the electronic device 200 via the third acoustic hole 205 positioned at the upper portion of the electronic device 200 and the first acoustic hole 206 and the second acoustic hole 207 positioned at the lower portion thereof in a state in which the electronic device 200 is folded.

The positions of the first acoustic hole 206, the second acoustic hole 207, and the third acoustic hole 205 illustrated in FIG. 6 are merely embodiments and the positions are not limited to the positions illustrated in FIG. 6. The positions of the first acoustic hole 206, the second acoustic hole 207, and the third acoustic hole 205 may be variously changed within a range in which those skilled in the art may implement the same.

Figure 7:
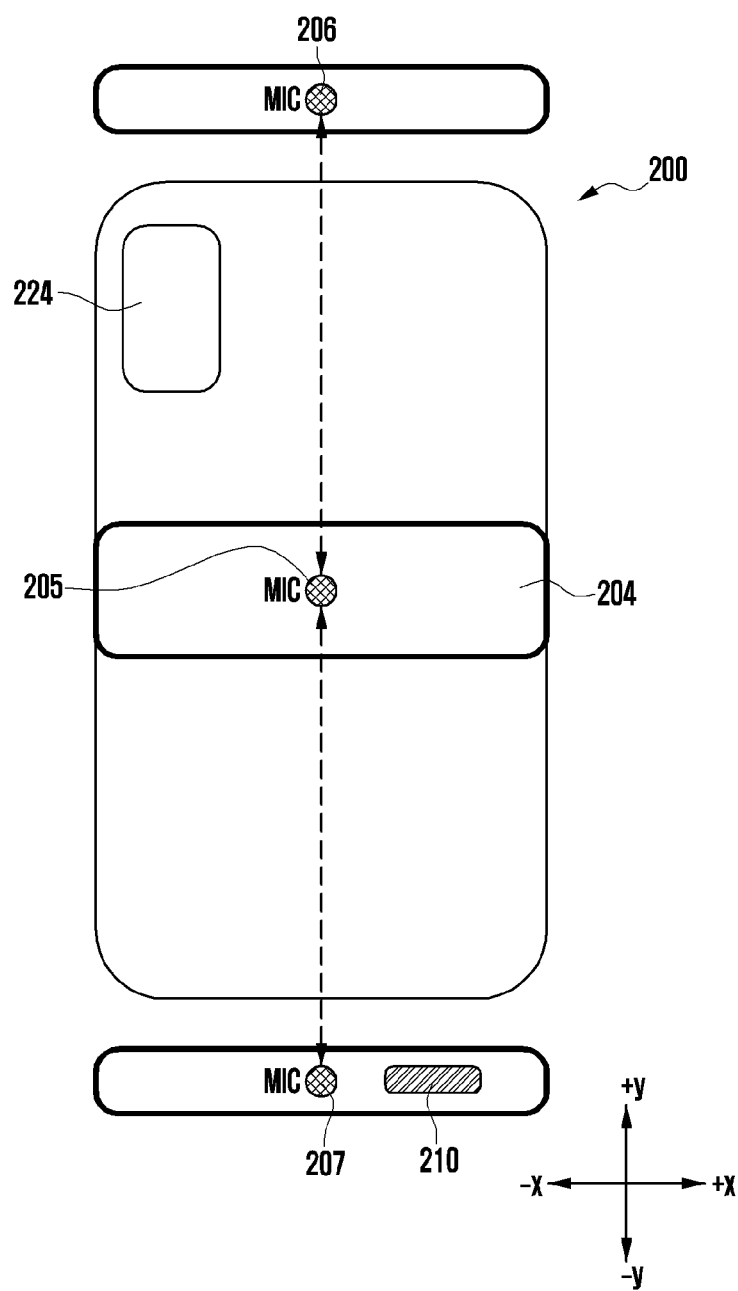
FIG. 7 is a view for illustrating a relationship between microphone modules in a state in which an electronic device is unfolded according to an embodiment of the disclosure.

FIG. 7 is a view for illustrating a relationship between microphone modules in a state in which an electronic device is unfolded according to an embodiment of the disclosure.

Referring to FIG. 7, according to various embodiments, in a state in which the electronic device 200 (e.g., the electronic device 101 in FIG. 1) is unfolded, the first acoustic hole 206 may be positioned at the top side of the first housing 201-1, the second acoustic hole 207 may be positioned at the bottom side of the second housing 201-2, and the third acoustic hole 205 may be positioned at the hinge cover 204. In this case, the distances between the first acoustic hole 206 and the third acoustic hole 205 and between the third acoustic hole 205 and the second acoustic hole 207 may increase to be greater than those in a structure where the third acoustic hole 205 is positioned at a rear camera cover 224 instead of the hinge cover 204. Therefore, according to the embodiment disclosed herein, a beamforming performance may be improved as the first acoustic hole 206, the second acoustic hole 207, and the third acoustic hole 205 arranged at the electronic device 200 are positioned to be physically far away from each other.

The positions of the first acoustic hole 206, the second acoustic hole 207, the third acoustic hole 205, and the speaker hole 210 illustrated in FIG. 7 are merely embodiments and the positions are not limited to the positions illustrated in FIG. 7. The positions of the first acoustic hole 206, the second acoustic hole 207, and the third acoustic hole 205, and the speaker hole 210 may be variously changed within a range in which those skilled in the art may implement the same.

An electronic device 200 (e.g., the electronic device 101 in FIG. 1) according to various embodiments disclosed herein may include a housing 201 including a first housing 201-1 and a second housing 201-2, a hinge unit 203 configured to rotatably connect the first housing and the second housing, a flexible printed circuit board 211 including a connection part 212 disposed at the hinge unit, and configured to connect an electronic component disposed at the first housing and an electronic component disposed at the second housing, and a microphone module 208 (e.g., the third microphone module 208 in FIG. 3A) disposed at a connection part of the flexible printed circuit board.

The hinge unit may include a hinge cover 204 at least a part of which forms the exterior of the electronic device, and which includes an acoustic hole 205 (e.g., the third acoustic hole 205 in FIG. 3B) which is an opening disposed at the hinge unit.

A soundproof member 214 disposed between the hinge cover and the connection part to close at least a part of a space between the hinge cover and the connection part may be further included.

The connection part may include a hole 213 and the microphone module 208 may be disposed on a first surface 212-1 of the connection part such that a microphone hole 209 of the microphone module 208 is connected to the hole.

The soundproof member may have one surface attached to the hinge cover and the other surface facing the connection part, and the acoustic hole disposed at the hinge cover and the hole of the connection part may be connected via an internal space 214-3 of the soundproof member.

The hole may change the relative position with respect to the acoustic hole of the hinge cover by a first displacement due to the movement of the connection part according to the rotation of the second housing with respect to the first housing.

The first displacement may include a displacement in a first axial direction (e.g., the X axis in FIG. 4B) and a displacement in a second axial direction (e.g., the Y axis in FIG. 4B) perpendicular to the first axial direction.

The size of the internal space of the soundproof member may be determined such that the hole and the acoustic hole are connected to each other by the internal space of the soundproof member even when the hole moves with respect to the acoustic hole by the first displacement.

A fixing member 217 configured to support the connection part to allow the connection part and the hinge cover to be in close contact with the soundproof member may be further included.

The fixing member may be attached to the first surface or a second surface 212-2 which is a surface opposite to the first surface of the connection part to be fixed to the connection part.

A first fixing hole 219 disposed at the hinge cover, a second fixing hole 220 disposed at the fixing member, and a connection member 218 extending through the first fixing hole and the second fixing hole and configured to couple the fixing member to the hinge cover may be further included.

A first fixing hole 219 disposed at an instrument disposed at the hinge unit, a second fixing hole 220 disposed at the fixing member, and a connection member 218 extending through the first fixing hole and the second fixing hole and configured to couple the fixing member to the instrument may be further included.

The second fixing hole may include a first area W1 extending in the first axial direction and a second area W2 extending in a second axial direction perpendicular to the first axis such that the fixing member may move together with the connection part according to the movement of the connection part due to the rotation of the second housing with respect to the first housing.

A slip member 221 disposed in at least one of a space between the connection member and the fixing member and a space between the soundproof member and the connection part to reduce friction force may be further included.

The soundproof member may have one surface attached to the connection part and the other surface facing the hinge cover, and the acoustic hole disposed at the hinge cover and the hole of the connection part may be connected to each other via the internal space of the soundproof member.

The acoustic hole of the hinge cover may change the relative position with respect to the hole of the connection part by a second displacement due to the movement of the connection part according to the rotation of the second housing with respect to the first housing.

The second displacement may include a displacement in the first axial direction (e.g., the X axis in FIG. 4D) and a displacement in the second axial direction (e.g., the Y axis in FIG. 4D) perpendicular to the first axial direction.

The size of the internal space of the soundproof member may be determined such that the acoustic hole and the hole are connected to each other by the internal space of the soundproof member even when the acoustic hole moves with respect to the hole by the second displacement.

The fixing member 217 configured to support the connection part to allow the connection part and the hinge cover to be in close contact with the soundproof member may be further included.

The fixing member may be attached to the first surface or the second surface which is a surface opposite to the first surface of the connection part to be fixed to the connection part.

While the disclosure has been shown and described with reference to various embodiments thereof, it will be understood by those skilled in the art that various changes in form and details may be made therein without departing from the spirit and scope of the disclosure as defined by the appended claims and their equivalents.

BRIEF DESCRIPTION OF REFERENCE NUMERALS

| | |
|---|---|
| 200: Electronic device | 201: Pair of housings |
| 203: Hinge unit | 204: Hinge cover |
| 205: Third acoustic hole | 212: Connection part |
| 214: Soundproof member | 217: Fixing member |

The invention claimed is:

1. An electronic device comprising:
a foldable housing including a first housing part and a second housing part;
a hinge assembly disposed in the foldable housing and configured to rotatably connect the first housing part and the second housing part;
a flexible printed circuit board comprising a connection part disposed at the hinge assembly, the flexible printed circuit board being configured to connect a first electronic component disposed at the first housing part and a second electronic component disposed at the second housing part; and
a microphone module disposed at the connection part of the flexible printed circuit board,
wherein the connection part comprises a hole, and
wherein the microphone module is disposed on a first surface of the connection part such that a microphone hole of the microphone module is connected to the hole of the connection part.

2. The electronic device of claim 1,
wherein the hinge assembly comprises a hinge cover at least a part of which forms an exterior of the electronic device, and
wherein the hinge cover comprises an acoustic hole which is an opening disposed at the hinge assembly.

3. The electronic device of claim 2, further comprising:
a soundproof member disposed between the hinge cover and the connection part to close at least a part of a space between the hinge cover and the connection part.

4. The electronic device of claim 3,
wherein the soundproof member has one surface attached to the hinge cover and another surface faces the connection part, and
wherein the acoustic hole disposed at the hinge cover and the hole of the connection part are connected via an internal space of the soundproof member.

5. The electronic device of claim 4, wherein the hole of the connection part changes a relative position with respect to the acoustic hole of the hinge cover by a first displacement due to a movement of the connection part according to a rotation of the second housing part with respect to the first housing part.

6. The electronic device of claim 5, wherein the first displacement comprises a displacement in a first axial direction and a displacement in a second axial direction perpendicular to the first axial direction.

7. The electronic device of claim 5, wherein a size of the internal space of the soundproof member is determined such that the hole and the acoustic hole are connected to each other by the internal space of the soundproof member even when the hole moves with respect to the acoustic hole by the first displacement.

8. The electronic device of claim 3, further comprising:
a fixing member configured to support the connection part to allow the connection part and the hinge cover to be in close contact with the soundproof member.

9. The electronic device of claim 8, wherein the fixing member is attached to a first surface or a second surface which is a surface opposite to the first surface of the connection part to be fixed to the connection part.

10. The electronic device of claim 8, further comprising:
a first fixing hole disposed at the hinge cover;
a second fixing hole disposed at the fixing member; and
a connection member extending through the first fixing hole and the second fixing hole and configured to couple the fixing member to the hinge cover.

11. The electronic device of claim 8, further comprising:
a first fixing hole disposed at an instrument disposed at the hinge assembly;
a second fixing hole disposed at the fixing member; and
a connection member extending through the first fixing hole and the second fixing hole and configured to couple the fixing member to the instrument.

12. The electronic device of claim 10, wherein the second fixing hole comprises a first area extending in a first axial direction and a second area extending in a second axial direction perpendicular to a first axis such that the fixing member is configured to move together with the connection part according to a movement of the connection part due to a rotation of the second housing part with respect to the first housing part.

13. The electronic device of claim 12, further comprising:
a slip member disposed in at least one of a space between the connection member and the fixing member and a space between the soundproof member and the connection part to reduce friction force.

14. The electronic device of claim 3,
wherein the soundproof member has one surface attached to the connection part and another surface facing the hinge cover, and
wherein the acoustic hole disposed at the hinge cover and the hole of the connection part are connected to each other via an internal space of the soundproof member.

15. The electronic device of claim 14, wherein the acoustic hole of the hinge cover changes a relative position with respect to the hole of the connection part by a second displacement due to a movement of the connection part according to a rotation of the second housing part with respect to the first housing part.

16. The electronic device of claim 15, wherein the second displacement comprises a displacement in a first axial direction and a displacement in a second axial direction perpendicular to the first axial direction.

17. The electronic device of claim 15, wherein a size of the internal space of the soundproof member is determined such that the acoustic hole and the hole are connected to each other by the internal space of the soundproof member even when the acoustic hole moves with respect to the hole by the second displacement.

18. The electronic device of claim 14, further comprising:
a fixing member configured to support the connection part to allow the connection part and the hinge cover to be in close contact with the soundproof member.

19. The electronic device of claim 18, wherein the fixing member is attached to a first surface or a second surface which is a surface opposite to the first surface of the connection part to be fixed to the connection part.

20. The electronic device of claim 1, wherein the microphone module comprises a first microphone module, a second microphone module, and a third microphone module,
wherein the electronic device further comprising a first acoustic hole disposed at an upper end of the first housing part, a second acoustic hole disposed at a lower end of the second housing part, and a third acoustic hole disposed at a hinge cover,
wherein the first microphone module is disposed at the first housing part such that a microphone hole of the first microphone module is connected to the first acoustic hole,
wherein the second microphone module is disposed at the second housing part such that a microphone hole of the second microphone module is connected to the second acoustic hole, and
wherein the third microphone module is disposed at the connection part of the flexible printed circuit board such that a microphone hole of the third microphone module is connected to the third acoustic hole.

* * * * *